(12) United States Patent
Kitazato et al.

(10) Patent No.: US 10,069,930 B2
(45) Date of Patent: Sep. 4, 2018

(54) TRANSMISSION APPARATUS, TRANSMISSION METHOD, RECEPTION APPARATUS AND RECEPTION METHOD

(71) Applicant: SONY CORPORATION, Tokyo (JP)

(72) Inventors: Naohisa Kitazato, Tokyo (JP); Yoshiharu Dewa, Tokyo (JP)

(73) Assignee: SONY CORPORATION, Tokyo (JP)

( * ) Notice: Subject to any disclaimer, the term of this patent is extended or adjusted under 35 U.S.C. 154(b) by 140 days.

(21) Appl. No.: 15/303,754

(22) PCT Filed: Nov. 11, 2014

(86) PCT No.: PCT/JP2014/079851
§ 371 (c)(1),
(2) Date: Oct. 13, 2016

(87) PCT Pub. No.: WO2015/186273
PCT Pub. Date: Dec. 10, 2015

(65) Prior Publication Data
US 2017/0041423 A1    Feb. 9, 2017

(30) Foreign Application Priority Data

Jun. 4, 2014  (JP) ................................ 2014-116283

(51) Int. Cl.
| | |
|---|---|
| *G06F 15/167* | (2006.01) |
| *H04L 29/08* | (2006.01) |
| *H04H 60/27* | (2008.01) |
| *H04L 29/06* | (2006.01) |
| *H04N 21/433* | (2011.01) |
| *H04N 21/434* | (2011.01) |
| *H04N 21/81* | (2011.01) |

(52) U.S. Cl.
CPC ......... *H04L 67/2847* (2013.01); *H04H 60/27* (2013.01); *H04L 67/06* (2013.01); *H04L 69/22* (2013.01); *H04N 21/4331* (2013.01); *H04N 21/4345* (2013.01); *H04N 21/8173* (2013.01)

(58) Field of Classification Search
None
See application file for complete search history.

(56) References Cited

U.S. PATENT DOCUMENTS

| | | | | |
|---|---|---|---|---|
| 6,785,731 B1* | 8/2004 | Westberg | ............... | B82Y 10/00 709/228 |
| 7,139,270 B1* | 11/2006 | Fatehi | ................... | H04J 3/1617 370/392 |
| 8,799,351 B1* | 8/2014 | Compton | ................ | H04L 67/06 709/203 |
| 2009/0240664 A1* | 9/2009 | Dinker | ................ | G06F 12/0842 |
| 2010/0014485 A1* | 1/2010 | Henry | ................... | G06F 13/387 370/331 |
| 2012/0017037 A1* | 1/2012 | Riddle | .............. | G06F 17/30519 711/103 |
| 2014/0129711 A1* | 5/2014 | Sharp | ...................... | G06F 21/31 709/225 |
| 2015/0052224 A1 | 2/2015 | Kitahara et al. | | |
| 2015/0215359 A1* | 7/2015 | Bao | ........................ | H04L 65/605 709/219 |
| 2016/0173556 A1* | 6/2016 | Park | ................... | H04N 21/2381 709/219 |
| 2016/0315991 A1* | 10/2016 | Oh | ........................ | H04N 21/236 |
| 2016/0337672 A1* | 11/2016 | Lee | ....................... | H04N 21/236 |
| 2016/0337707 A1* | 11/2016 | Oh | ..................... | H04N 21/2381 |

FOREIGN PATENT DOCUMENTS

| | | |
|---|---|---|
| JP | 2007-274193 A | 10/2007 |
| JP | 2013-153291 A | 8/2013 |
| WO | WO 2013/065278 A1 | 5/2013 |

OTHER PUBLICATIONS

International Search Report dated Feb. 17, 2015, in Application No. PCT/JP2014/079851, Filed Nov. 11, 2014.
International Standards Organization, "Information technology—High efficiency coding and media delivery in heterogeneous environments—Part 1: MPEG media transport (MMT)", ISO/IEC JTC 1/SC 29 Apr. 26, 2013, 90 pages.
"Digital Video Broadcasting (DVB); IP Datacast: Content Delivery Protocols (CDP) Implementation Guidelines; Part 1: IP Datacast over DVB-H", ETSI TS 102 591-1 V1.3.1, Feb. 2010, 4 pages.
Otsuki et al., "A Study of MMT-based Data Transmission Scheme for Super Hi-Vision Satellite Broadcasting Systems", ITE Technical report, vol. 38, No. 14, Feb. 28, 2014, 14 pages (With English Abstract and English Translation).
Extended European Search Report dated Dec. 1, 2017 in Patent Application No. 14893717.0.
"Text of ISO/IEC 2$^{nd}$ CD 23008-1 MPEG Media Transport", International Organization for Standardization, ISO/IEC JTC1/SC29/WG11, Coding of Moving Pictures and Audio, MPEG/N13293, MPEG-H Systems, XP055306397A, 2012, 153 pages.
"Digital Video Broadcasting (DVB); Signaling and carriage of interactive applications and services in Hybrid broadcast/broadband environments" ETSI TS 102 809, V1.1.1, XP055120418A, Jan. 2010, 98 pages.

* cited by examiner

*Primary Examiner* — Brian Whipple
(74) *Attorney, Agent, or Firm* — Oblon, McClelland, Maier & Neustadt, L.L.P.

(57) ABSTRACT

A data broadcasting file based on HTML5 is transported in an MMT method. In a data content management table, information of a list of broadcasting transport files and a central file constituting a presentation unit, and a list of files to be pre-cached is described for each data broadcasting presentation unit. When a list of broadcasting files constituting a data broadcasting presentation unit to be referred to next after a current data broadcasting presentation unit is designated as a pre-cache target, a receiver side can pre-cache file data necessary for a data broadcasting presentation unit to be transitioned to next, and a timely data broadcasting service interoperating with a broadcast program can be realized.

5 Claims, 35 Drawing Sheets

FIG. 9

DU_Header OF MFU IN WHICH TIMED MEDIA ARE DISPOSED 900

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|                    movie_fragment_sequence_number             |
+-+-+-+-+-+-+-+-+-+-+-+-+-+-+-+-+-+-+-+-+-+-+-+-+-+-+-+-+-+-+-+-+
|                         sample_number                         |
+-+-+-+-+-+-+-+-+-+-+-+-+-+-+-+-+-+-+-+-+-+-+-+-+-+-+-+-+-+-+-+-+
|                            offset                             |
+-+-+-+-+-+-+-+-+-+-+-+-+-+-+-+-+-+-+-+-+-+-+-+-+-+-+-+-+-+-+-+-+
|    priority   |  dep_counter  |
+-+-+-+-+-+-+-+-+-+-+-+-+-+-+-+-+-+-+-+-+-+-+-+-+-+-+-+-+-+-+-+-+
```

FIG. 10

DU_Header OF MFU IN WHICH NON-TIMED MEDIA ARE DISPOSED 1000

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|                            item_ID                            |
+-+-+-+-+-+-+-+-+-+-+-+-+-+-+-+-+-+-+-+-+-+-+-+-+-+-+-+-+-+-+-+-+
```

PA MESSAGE 1300

```
PA_message () {
    message_id                              16      uimsbf
    version                                  8      uimsbf
    length                                  32      uimsbf
    extension {
        number_of_tables        N1           8      uimsbf
        for (i=0; i<N1; i++) {
            table_id                         8      uimsbf
            table_version                    8      uimsbf
            table_length                    16      uimsbf
        }
    }
    message_payload {
        for (i=0; i<N1; i++) {
            table()
        }
    }
}
```

FIG. 14

| ITEM | JAPANESE NAME OF ITEM | DESCRIPTION |
|---|---|---|
| message_id | MESSAGE ID | FIXED VALUE FOR IDENTIFYING PA message IN VARIOUS KINDS OF SIGNALING INFORMATION |
| version | VERSION | INDICATE VERSION OF PA Message. INCREMENT BY 1 WHEN AT LEAST SOME PARAMETERS INCLUDED IN MPT OF 8-bit INTEGER VALUE ARE UPDATED. |
| length | TABLE LENGTH | NUMBER OF BYTES OF PA Message. COUNTED FROM IMMEDIATELY AFTER THIS FIELD. |

FIG. 15

MP TABLE (FIRST HALF)

| Syntax | Value | No. of bits | Mnemonic |
|---|---|---|---|
| MP_table() { | | | |
|   table_id | | 8 | uimsbf |
|   version | | 8 | uimsbf |
|   length | | 16 | uimsbf |
|   reserved | '11 1111' | 6 | bslbf |
|   MP_table_mode | | 2 | bslbf |
|   If (table_id == SUBSET_0_MPT_TABLE_ID) { | | | |
|     MMT_package_id { | N1 | | |
|       MMT_package_id_length | | 8 | uimsbf |
|       for (i=0; i<N1; i++) { | | | |
|         MMT_package_id_byte | | 8 | uimsbf |
|       } | | | |
|     } | | | |
|   } | | | |
|   MP_table_descriptors { | N2 | | |
|     MP_table_descriptors_length | | 16 | uimsbf |
|     for (i=0; i<N2; i++) { | | | |
|       MP_table_descriptors_byte | | 8 | uimsbf |
|     } | | | |
|   } | | | |
| } | | | |

FIG. 16

MP TABLE (SECOND HALF)

| Syntax | Value | No. of bits | Mnemonic |
|---|---|---|---|
| number_of_assets | N3 | 8 | uimsbf |
| for (i=0; i<N3; i++) { | | | |
|   identifier_type | | 8 | uimsbf |
|   asset_id_scheme | | 32 | uimsbf |
|   asset_id_length | | 8 | uimsbf |
|   for(j=0;j<N4;j++){ | | | |
|     asset_id_byte | | 8 | uimsbf |
|   } | | | |
|   asset_type | | 32 | char |
|   reserved | '1111 111' | 7 | bslbf |
|   asset_clock_relation_flag | | 1 | bslbf |
|   asset_location { | | | uimsbf |
|     location_count | N6 | 8 | |
|     for (i=0; i<N6; i++) { | | | |
|       MMT_general_location_info() | | | |
|     } | | | |
|   } | | | |
|   asset_descriptors { | | | |
|     asset_descriptors_length | N5 | 16 | uimsbf |
|     for (j=0; j<N5; j++) { | | | |
|       asset_descriptors_byte | | 8 | uimsbf |
|     } | | | |
|   } | | | |
| } | | | |
| } | | | |

FIG. 17

| ITEM | JAPANESE NAME OF ITEM | DESCRIPTION |
|---|---|---|
| table_id | TABLE ID | FIXED VALUE FOR IDENTIFYING MP table IN VARIOUS KINDS OF SIGNALING INFORMATION |
| version | VERSION | INDICATE VERSION OF MPT. INCREMENT BY 1 WHEN AT LEAST SOME PARAMETERS INCLUDED IN MPT OF 8-bit INTEGER VALUE ARE UPDATED. |
| length | TABLE LENGTH | NUMBER OF BYTES OF MP table. COUNTED FROM IMMEDIATELY AFTER THIS FIELD. |
| package_id | PACKAGE ID | IDENTIFICATION INFORMATION AS WHOLE PACKAGE HAVING ALL SIGNALS TRANSPORTED IN BROADCASTING SIGNAL AND FILES AS CONSTITUENT ELEMENTS. |
| MPT_descriptors | MPT DESCRIPTOR AREA | STORAGE AREA OF DESCRIPTORS RELATED TO WHOLE PACKAGE. ONE OR MORE THAN ONE DESCRIPTOR IS ASSUMED TO BE DISPOSED WITH DESCRIPTORS STIPULATED FOR VARIOUS PURPOSES |
| number_of_assets | NUMBER OF ASSETS | NUMBER OF SIGNALS (ASSETS) AS ELEMENTS CONSTITUTING PACKAGE. SAME NUMBER OF FOLLOWING ASSET LOOPS AS THIS NUMBER ARE SET |
| asset_id | ASSET ID | ID FOR UNIQUELY IDENTIFYING ASSET |
| gen_loc_info | GENERAL LOCATION INFORMATION | INDICATE LOCATION OF ACQUISITION SOURCE OF ASSET |
| asset_descriptors | ASSET DESCRIPTOR AREA | STORAGE AREA OF DESCRIPTORS RELATED TO ASSETS. ONE OR MORE THAN ONE DESCRIPTOR IS ASSUMED TO BE DISPOSED WITH DESCRIPTORS STIPULATED FOR VARIOUS PURPOSES. |

FIG. 18

M2 SECTION MESSAGE 1800

| Syntax | No. of bits | Mnemonic |
|---|---|---|
| M2section_message(){ | | |
|     message_id | 16 | uimsbf |
|     version | 8 | uimsbf |
|     length | 16 | uimsbf |
|     table_id | 8 | uimsbf |
|     section_syntax_indicator | 1 | bslbf |
|     '1' | 1 | bslbf |
|     '11' | 2 | bslbf |
|     section_length | 12 | uimsbf |
|     table_id_extension | 16 | uimsbf |
|     '11' | 2 | bslbf |
|     version_number | 5 | uimsbf |
|     current_next_indicator | 1 | bslbf |
|     section_number | 8 | uimsbf |
|     last_section_number | 8 | uimsbf |
|     for(i=0; i<N; i++){ | | |
|         signaling_data_byte | 8 | bslbf |
|     } | | |
|     CRC_32 | 32 | rpcof |
| } | | |
| | | uimsbf |
| | | uimsbf |

FIG. 19

MH AI TABLE (MH AIT) 1900

| Syntax | No. of bits | Mnemonic |
|---|---|---|
| MH-Applicatin_Information_Table(){ | | |
|     table_id | 8 | uimsbf |
|     section_syntax_indicator | 1 | bslbf |
|     reserved_future_use | 1 | bslbf |
|     reserved | 2 | bslbf |
|     section_length | 12 | uimsbf |
|     application type | 16 | uimsbf |
|     reserved | 2 | bslbf |
|     version_number | 5 | uimsbf |
|     current_next_indicator | 1 | bslbf |
|     section_number | 8 | uimsbf |
|     last_section_number | 8 | uimsbf |
|     reserved_future_use | 4 | bslbf |
|     common_descriptor_length | 8 | uimsbf |
|     for(i=0; i<N; i++){ | | |
|         descriptor () | | rpcof |
|     } | | |
|     reserved_future_use | 4 | uimsbf |
|     application_loop_length | | |
|     for(i=0; i<N; i++){ | | |
|         application_identifier () | | |
|         application_control_code | 8 | uimsbf |
|         reserved_future_use | 4 | bslbf |
|         application_descriptor_loop_length | 12 | uimsbf |
|         for (j=0; j<M; j++) { | | |
|             descriptor () | | |
|         } | | |
|     } | | |
|     CRC32 | 32 | rpcof |
| } | | |

FIG. 20

APPLICATION INFORMATION DESCRIPTOR 2000 

| Syntax | No. of bits | Mnemonic |
|---|---|---|
| application_descriptor(){ | | |
|     descriptor_tag | 8 | uimsbf |
|     descriptor_length | 8 | uimsbf |
|     application_profile_length | 8 | uimsbf |
|     for(i=0;i<N;i++){ | | |
|         application_profile | 16 | uimsbf |
|         version_major | 8 | uimsbf |
|         version_minor | 8 | uimsbf |
|         version_micro | 8 | uimsbf |
|     } | | |
|     service_bound_flag | 1 | bslbf |
|     visibility | 2 | bslbf |
|     reserved_future_use | 5 | bslbf |
|     application_priority | 8 | uimsbf |
|     for(i=0;i<N;i++){ | | |
|         transport_protocol_label | 8 | uimsbf |
|     } | | |
| } | | |

FIG. 21

| DATA | SEMANTICS |
|---|---|
| application_profile | PROFILE OF RECEIVER THAT CAN EXECUTE PRESENT APPLICATION. INDICATE REQUESTED FUNCTION IN BITMAP OF EACH FUNCTION REQUESTED FROM RECEIVER. HIGH-ORDER 3 BITS INDICATE FUNCTION BITMAP SWITCHING. BITMAP IS STIPULATED FOR EACH version. |
| version_major version_minor version_micro | VERSION STIPULATED IN APPLICATION PROFILE. |
| service_bound_flag | INDICATE WHETHER OR NOT PRESENT APPLICATION IS EFFECTIVE ONLY IN CURRENT SERVICE. |
| visibility | INDICATE WHETHER OR NOT APPLICATION IS VISIBLE. |
| application_priority | RELATIVE PRIORITY IN APPLICATIONS NOTIFIED OF IN THIS SERVICE. |
| transport_protocol_label | INDICATE PROTOCOL TRANSPORTING APPLICATION. |

TRANSPORT PROTOCOL DESCRIPTOR 2200

| Syntax | No. of bits | Mnemonic |
|---|---|---|
| transport_protocol_descriptor(){ | | |
|    descriptor_tag | 8 | uimsbf |
|    descriptor_length | 8 | uimsbf |
|    protocol_id | 16 | uimsbf |
|    transport_protocol_label | 8 | uimsbf |
|    for(i=0;i<N;i++){ | | |
|       selector_byte | 8 | uimsbf |
|    } | | |
| } | | |

FIG. 23

SELECTOR BYTE 2300

| Syntax | No. of bits | Mnemonic |
|---|---|---|
| for(i=0;i<N;i++){ | | |
|   URL_base_length | 8 | uimsbf |
|   for(j=0;j<N;j++){ | | |
|     URL_base_byte | 8 | uimsbf |
|   } | | |
|   URL_extension_count | 8 | uimsbf |
|   for(j=0;j<URL_extension_count;j++){ | | |
|     URL_extension_length | 8 | uimsbf |
|     for(k=0;k<URL_extension_length;k++){ | | |
|       URL_extension_byte | 8 | uimsbf |
|     } | | |
|   } | | |
| } | | |

DATA TRANSMISSION MESSAGE 2400

| Syntax | No. of bits | Mnemonic |
|---|---|---|
| Data_Transmission_message(){ | | |
|     message_id | 16 | uimsbf |
|     version | 8 | uimsbf |
|     length | 32 | uimsbf |
|     num_of_tables | 8 | uimsbf |
|     for (i=0; i<num_of_tables;i++) { | | |
|         table_id | 8 | uimsbf |
|         table_version | 8 | uimsbf |
|         table_length | 16 | |
| | | uimsbf |
|     } | | |
|     for (i=0; i<num_of_tables; i++) { | | |
|         table() | | |
|     } | | |
| } | | |

FIG. 25

DATA ASSET MANAGEMENT TABLE (DAMT) 2500

| Syntax | No. of bits | Mnemonic |
|---|---|---|
| Data_Asset_Management_Table(){ | | |
|   table_id | 8 | uimsbf |
|   version | 8 | uimsbf |
|   length | 16 | uimsbf |
|   number_of_asset | 8 | Uimsbf |
|   for(k=0;k<number_of_asset;k++){ | | |
|     download_id | 32 | uimsbf |
|     asset_ID_scheme | 32 | uimsbf |
|     asse_ID_length | 8 | Uimsbf |
|     for(i=0;i<asset_ID_length;i++){ | | |
|       asset_ID_byte | 8 | uimsbf |
|     } | | |
|     number_of_items | 8 | uimsbf |
|     for (i=0;i<number_of_items;i++){ | | |
|       item_ID | 32 | uimsbf |
|       node_tag | 16 | uimsbf |
|       item_size | 32 | uimsbf |
|       item_version | 8 | uimsbf |
|       item_checksum | 32 | uimsbf |
|       item_info_length | 8 | uimsbf |
|       for(j=0;j<item_info_length;j++){ | | |
|         item_info () | | |
|       } | | |
|     } | | |
|     descriptor_loop_length | 16 | uimsbf |
|     for(i=0;i<descriptor_loop_length;i++){ | | |
|       descriptor() | | |
|     } | | |
|   } | | |
| } | | |

FIG. 26

DATA DIRECTORY MANAGEMENT TABLE (DDMT) 2600

| Syntax | No. of bit | Mnemonic |
|---|---|---|
| Data_Directory_Management_Table(){ | | |
|     table_id | 8 | uimsbf |
|     version | 8 | uimsbf |
|     length | 16 | uimsbf |
|     base_folder_path_length | 8 | uimsbf |
|     for(i=0;i<base_folder_path_length;i++){ | | |
|         base_folder_path_byte | 8 | uimsbf |
|     } | | |
|     number_of_folder_nodes | 8 | uimsbf |
|     for(i=0;i<number_of_folder_nodes;i++){ | | |
|         node_tag | 16 | uimsbf |
|         folder_node_path_length | 16 | uimsbf |
|         for(j=0;j<folder_node_path_length;j++){ | | |
|             forder_node_path_byte | 8 | char |
|         } | | |
|         num_of_files | 16 | uimsbf |
|         for(j=0;j<num_of_files;j++){ | | |
|             node_tag | 16 | uimsbf |
|             file_name_length | 8 | uimsbf |
|             for (k=0;k<file_name_length;k++){ | | |
|                 file_name_byte | 8 | char |
|             } | | |
|         } | | |
|     } | | |
| } | | |

FIG. 27

DATA CONTENT MANAGEMENT TABLE (DCMT) 2700

| Syntax | No. of bit | Mnemonic |
|---|---|---|
| Data_Content_Management_Table(){ | | |
|   table_id | 8 | uimsbf |
|   version | 8 | uimsbf |
|   length | 16 | uimsbf |
|   number_of_content | 8 | uimsbf |
|   for(i=0;i<number_of_items;i++){ | | |
|     contentID | 16 | uimsbf |
|     content_version | 8 | uimsbf |
|     content_cache_size | 32 | uimsbf |
|     number_of_PU | 8 | uimsbf |
|     for(j=0;j<number_of_PU;j++){ | | |
|       PU_tag | 8 | uimsbf |
|       PU_cache_size | 32 | uimsbf |
|       PU_primary_item_node_tag | 16 | uimsbf |
|       number_of_PU_member_nodes | 16 | uimsbf |
|       for(k=0;k<number_of_nodes;j++){ | | |
|         PU_member_node_tag | 16 | uimsbf |
|       } | | |
|       number_of_pre_cache_nodes | 8 | uimsbf |
|       for(k=0;k<number_of_pre_cache_nodes;k++){ | | |
|         pre_cache_node_tag | 16 | uimsbf |
|       } | | |
|       number_of_linked_PU | 8 | uimsbf |
|       for(k=0;k<number_of_linkedPU;k++){ | | |
|         linked_PU_tag | 8 | uimsbf |
|       } | | |
|     } | | |
|   } | | |
| } | | |

FIG. 28

DATA CONTENT MANAGEMENT TABLE (DCMT) 2800

| Syntax | No. of bit | Mnemonic |
|---|---|---|
| Data_Content_Management_Table(){ | | |
|   table_id | 8 | uimsbf |
|   version | 8 | uimsbf |
|   length | 16 | uimsbf |
|   number_of_content | 8 | uimsbf |
|   for(i=0;i<number_of_items;i++){ | | |
|     contentID | 16 | uimsbf |
|     content_version | 8 | uimsbf |
|     content_cache_size | 32 | uimsbf |
|     number_of_PU | 8 | uimsbf |
|     for(j=0;j<number_of_PU;j++){ | | |
|       PU_tag | 8 | uimsbf |
|       PU_cache_size | 32 | uimsbf |
|       PU_primary_item_node_tag | 16 | uimsbf |
|       number_of_PU_member_nodes | 16 | uimsbf |
|       for(k=0;k<number_of_nodes;j++){ | | |
|         PU_member_node_tag | 16 | uimsbf |
|       } | | |
|       number_of_lock_cache_nodes | 8 | uimsbf |
|       for(k=0;k<number_of_lock_cache_nodes;k++){ | | |
|         lock_cache_node_tag | 16 | uimsbf |
|       } | | |
|       number_of_unlock_cache_nodes | 8 | uimsbf |
|       for(k=0;k<number_of_unlock_cache_nodes;k++){ | | |
|         unlock_cache_node_tag | 16 | uimsbf |
|       } | | |
|       number_of_linked_PU | 8 | uimsbf |
|       for(k=0;k<number_of_linkedPU;k++){ | | |
|         linked_PU_tag | 8 | uimsbf |
|       } | | |
|     } | | |
|   } | | |
| } | | |

# TRANSMISSION APPARATUS, TRANSMISSION METHOD, RECEPTION APPARATUS AND RECEPTION METHOD

TECHNICAL FIELD

The technology disclosed in the present specification relates to a transmission apparatus and a transmission method for transmitting data broadcasting files using a predetermined transport method and a reception apparatus and a reception method for receiving data broadcasting files transported using a predetermined transport method.

BACKGROUND ART

In current broadcasting systems, a Moving Picture Experts Group-2 Transport Stream (MPEG-2 TS) method and a Real Time Protocol (RTP) method are widely used as transport methods for media (for example, refer to Patent Literature 1). For a next-generation digital broadcasting method, MPEG has discussed MPEG Media Transport (MMT) that has been standardized as a new media transport method (for example, refer to Non-Patent Literature 1). Combinations of different transmission paths can be easily used in MMT, which can be used in common for a plurality of transmission paths of broadcasting and communication.

According to the MMT method, both timed media such as videos or sounds that are stream media and non-timed media such as files can be transported on MMT packets. Timed media mentioned here include stream data of main content of broadcast programs, such as videos, audio, and captions. In addition, non-timed media is file data of data broadcasting applications (content), for example, Hyper Text Markup Language (HTML) documents.

Data broadcasting interoperating with a broadcast program is required to be presented in a timely manner. Meanwhile, each of files used in data broadcasting is repetitively transported in a limited broadcasting transport band. Reception terminals can realize timely presentation of data broadcasting by caching data broadcasting files. However, if a reception terminal that is not equipped with an ample cache memory experiences a cache miss for a necessary file, a next repetition period should be awaited, and thus a delay of about, for example, dozens of seconds occurs before data broadcasting is presented.

In a data broadcasting service based on Broadcast Markup Language (BML) in operation at the time of the present application, when an Application Programming Interface (API) that is "LockModuleOnMemory( )" is called out, a specific file can be pre-cached in a cache memory and saved (refer to, for example, Patent Literature 2).

CITATION LIST

Patent Literature

Patent Literature 1: JP 2013-153291A
Patent Literature 1: JP 2007-274193A

Non-Patent Literature

Non-Patent Literature 1: ISO/IEC FDIS 23008-1:2013 (E) Information technology—High efficiency coding and media delivery in heterogeneous environments—Part1: MPEG media transport (MMT)

SUMMARY OF INVENTION

Technical Problem

An objective of the technology disclosed in the present specification is to provide a transmission apparatus and a transmission method that enable data broadcasting files to be satisfactorily transmitted using a predetermined transport method.

Another objective of the technology disclosed in the present specification is to provide a reception apparatus and a reception method that enable data broadcasting files transported using a predetermined transport method to be satisfactorily received.

Solution to Problem

The present application has been made in view of the above problem, and a technology according to claim 1 is a transmission apparatus including: a file data transmission unit configured to transmit file data to be used in data broadcasting; and a signaling message transmission unit configured to include compulsory cache information for designating compulsory cache of file data in signaling related to data broadcasting and transmit the information.

According to a technology according to claim 2 of the present application, the signaling message transmission unit of the transmission apparatus according to claim 1 transmits a data transmission message including a data content management table in which information of a list of broadcasting transport files and a central file constituting a presentation unit, and a list of pre-cache target files is described for each data broadcasting presentation unit.

According to a technology according to claim 3 of the present application, the signaling message transmission unit of the transmission apparatus according to claim 1 transmits a data transmission message including a data content management table in which information of a list of broadcasting transport files and a central file constituting a presentation unit, and a target file to be locked in a cache and a target file to be unlocked among lock targets is described for each data broadcasting presentation unit.

According to a technology according to claim 4 of the present application, the transmission apparatus according to any of claims 1 to 3 further includes: a media data transmission unit configured to transmit media data of the main body of a broadcast program with which data broadcasting interoperates.

A technology according to claim 5 of the present application is a transmission method including: a file data transmission step of transmitting file data to be used in data broadcasting; and a signaling message transmission step of including compulsory cache information for designating compulsory cache of file data in signaling related to data broadcasting and transmitting the information.

A technology according to claim 6 of the present application is a reception apparatus including: a file data reception unit configured to transmit file data to be used in data broadcasting; a signaling message reception unit configured to include compulsory cache information for designating compulsory cache of file data in signaling related to data broadcasting and transmit the information; and a control unit configured to control cache of the file data received by the file data reception unit in a cache memory based on the compulsory cache information.

According to a technology according to claim 7 of the present application, the signaling message reception unit of the reception apparatus according to claim 6 receives a data transmission message including a data content management table in which information of a list of broadcasting transport files and a central file constituting a presentation unit, and a list of pre-cache target files is described for each data broadcasting presentation unit.

According to a technology according to claim 8 of the present application, when the file data receives a file included in the list of pre-cache target files, the control unit of the reception apparatus according to claim 7 pre-caches the file in the cache memory.

According to a technology according to claim 9 of the present application, the signaling message reception unit of the reception apparatus according to claim 6 receives a data transmission message including a data content management table in which information of a list of broadcasting transport files and a central file constituting a presentation unit, and a target file to be locked in a cache and a target file to be unlocked among lock targets is described for each data broadcasting presentation unit.

According to a technology according to claim 10 of the present application, when the file data receives the lock target file, the control unit of the reception apparatus according to claim 9 pre-caches the file in the cache memory.

According to a technology according to claim 11 of the present application, the control unit of the reception apparatus according to claim 9 deletes the unlock target file from the cache memory.

According to a technology according to claim 12 of the present application, when the file data receives a list of broadcasting transport files and a central file constituting a current data broadcasting presentation unit, the control unit of the reception apparatus according to any of claims 6 and 9 caches the data in the cache memory.

According to a technology according to claim 13 of the present application, the reception apparatus according to any of claims 6 to 12 further includes: a data broadcasting presentation unit configured to present data broadcasting using file data.

According to a technology according to claim 14 of the present application, the reception apparatus according to any of claims 6 to 13, further includes: a media data reception unit configured to receive media data of the main body of a broadcast program with which data broadcasting interoperates; and a broadcast program presentation unit configured to present a broadcast program based on media data.

A technology according to claim 15 of the present application is a reception method including: a file data reception step of transmitting file data to be used in data broadcasting; a signaling message reception step of including compulsory cache information for designating compulsory cache of file data in signaling related to data broadcasting and transmitting the information; and a control step of controlling cache of the file data received by the file data reception unit in a cache memory based on the compulsory cache information.

Advantageous Effects of Invention

The technology disclosed in the present specification assumes that, for example, data broadcasting files based on Hyper Text Markup Language (HTML) 5 are transported using the MMT method. According to the technology disclosed in the present specification, a transmission apparatus of a broadcasting station or the like can include information for designating compulsory cache in signaling related to data broadcasting and transport the information. In addition, according to the technology disclosed in the present specification, a reception apparatus such as a set-top box (STB) or a television receiver installed in a household can satisfactorily perform cache control of each data broadcasting file based on compulsory cache information included in received signaling related to data broadcasting, and thus can present data broadcasting interoperating with a broadcast program in a timely manner.

Note that the advantageous effects described in this specification are merely for the sake of example, and advantageous effects of the present invention are not limited thereto. Furthermore, in some cases, the present invention may also exhibit additional advantageous effects other than the advantageous effects given above.

Further objectives, features, and advantages of the technology disclosed in this specification will be clarified by more detailed description based on the exemplary embodiments discussed hereinafter and the attached drawings.

BRIEF DESCRIPTION OF DRAWINGS

FIG. 9 is a diagram illustrating an example of a configuration of DU_Header 900 of an MFU in which timed media are disposed in a payload.

FIG. 10 is a diagram illustrating an example of a configuration of DU_Header 1000 of an MFU in which non-timed media are disposed in a payload.

FIG. 14 is a diagram showing description of parameters included in the PA message.

FIG. 15 is a diagram illustrating an example of (a first half of) syntax of an MP table (MPT).

FIG. 16 is a diagram illustrating an example of (a second half of) syntax of the MP table.

FIG. 17 is a diagram for describing respective parameters included in the MP table.

FIG. 18 is a diagram illustrating an example of a configuration of an M2 section message 1800.

FIG. 19 is a diagram illustrating an example of a configuration of an MH Application Information (AI) table (MH AIT) 1900 transported in the M2 section message.

FIG. 20 is a diagram illustrating an example of a configuration of an application information descriptor 2000.

FIG. 21 is a diagram showing description of parameters included in the application information descriptor.

FIG. 23 is a diagram illustrating an example of a configuration of a selector byte common to HTTP/HTTPS, MMT, and non-timed transport.

FIG. 25 is a diagram illustrating an example of a configuration of a data asset management table (DAMT) 2500.

FIG. 26 is a diagram illustrating an example of a configuration of a data directory management table (DDMT) 2600.

FIG. 27 is a diagram illustrating an example of a configuration of a data content management table (DCMT) 2700.

FIG. 28 is a diagram illustrating an example of a configuration of a data content management table (DCMT) 2700.

DESCRIPTION OF EMBODIMENT(S)

Embodiments of the technology disclosed in the present specification will be described in detail with reference to the drawings below.

Figure 1:
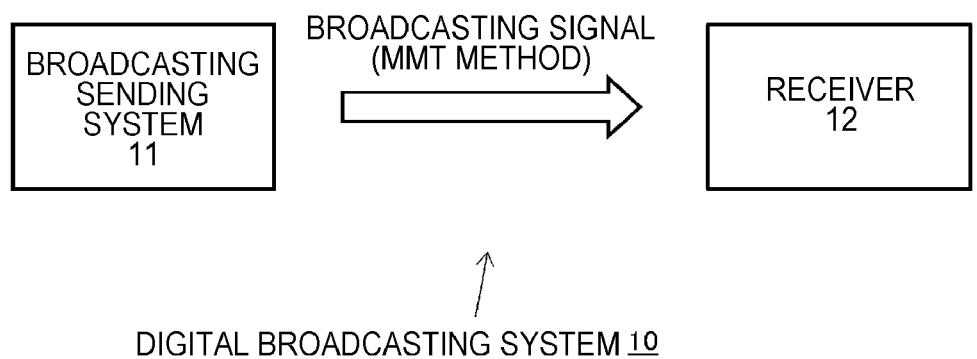
FIG. 1 is a diagram schematically illustrating an example of a configuration of a digital broadcasting system 10 to which the technology disclosed in the present specification is applied.

FIG. 1 schematically illustrates an example of a configuration of a digital broadcasting system 10 to which the technology disclosed in the present specification is applied. The illustrated digital broadcasting system 10 includes a broadcasting sending system 11 and a receiver 12.

The broadcasting sending system 11 transmits broadcasting signals including transport media of an Internet protocol (IP) method. The transport media of the broadcasting signals include timed media and non-timed media such as files. Timed media is stream data related to the main content of a broadcast program, for example, videos, audio, captions, and the like. In addition, non-timed media is file data used in data broadcasting, for example, HTML documents. In description below, a data broadcasting service based on HTML5 will be assumed.

Meanwhile, the receiver 12 receives broadcasting signals sent from the broadcasting sending system 11. In addition, the receiver 12 acquires transport media such as videos, audio, or captions from the received broadcasting signals and presents images or sounds. In addition, when the receiver 12 acquires each piece of file data for data broadcasting from the received broadcasting signals, the receiver starts an application engine such as an HTML browser to present data broadcasting interoperating with a broadcast program.

Figure 2:
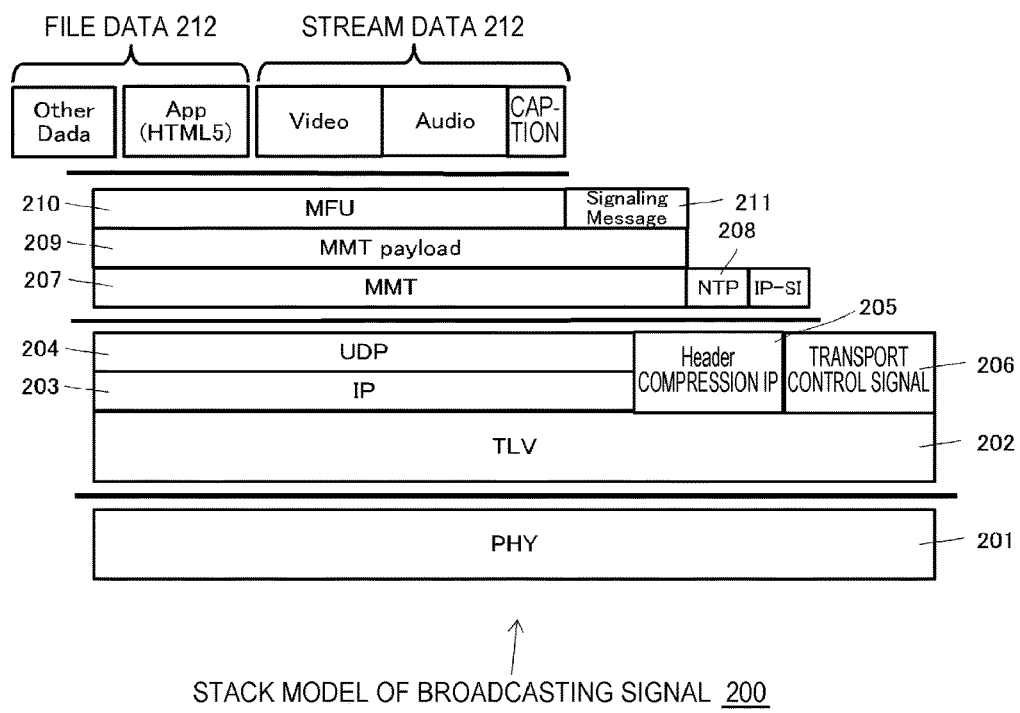
FIG. 2 is a diagram illustrating a stack model 200 of a broadcasting signal to which MMT is applied.

In the digital broadcasting system 10 illustrated in FIG. 1, MMT to be applied as a transport method when broadcasting signals are transported from the broadcasting sending system 11 to the receiver 12 is assumed. FIG. 2 illustrates an example of a configuration of a broadcasting signal of this case using a stack model 200.

A physical layer (PHY) 201 is positioned in the lowest layer of the stack model 200. The physical example 201 includes a modulation method, an error correction method, or the like.

A Type Length Value (TLV) transport packet layer 202 is positioned above the physical layer 201. In addition, an IP packet 203 is placed above the TLV 202, and a user datagram protocol (UDP) 204 is placed further up. In addition, a header compression IP 205 in which headers of the IP 203 and the UDP 204 are compressed and a transport control signal 206 as signaling information are also placed above the TLV transport packet 202.

An MMT packet 207, a network time protocol (NTP) packet 208 including information of current time, and the like are placed above the UDP 204. An MMT protocol (MMTP) is a transport protocol of an application layer for transporting an MMTP payload 209 on an IP network.

The MMT payload 209 of the MMT packet 207 includes an MMT fragment unit (MFU) 210 or a signaling message 211 related to data broadcasting. The MFU 210 is a fragment of a media processing unit (MPU) that is a container of encoded timed media and non-timed media. Stream data (timed media) 212 such as videos, audio, captions or file data (non-timed media) 213 such as HTML document data is inserted into the MFU 210.

Figure 3:
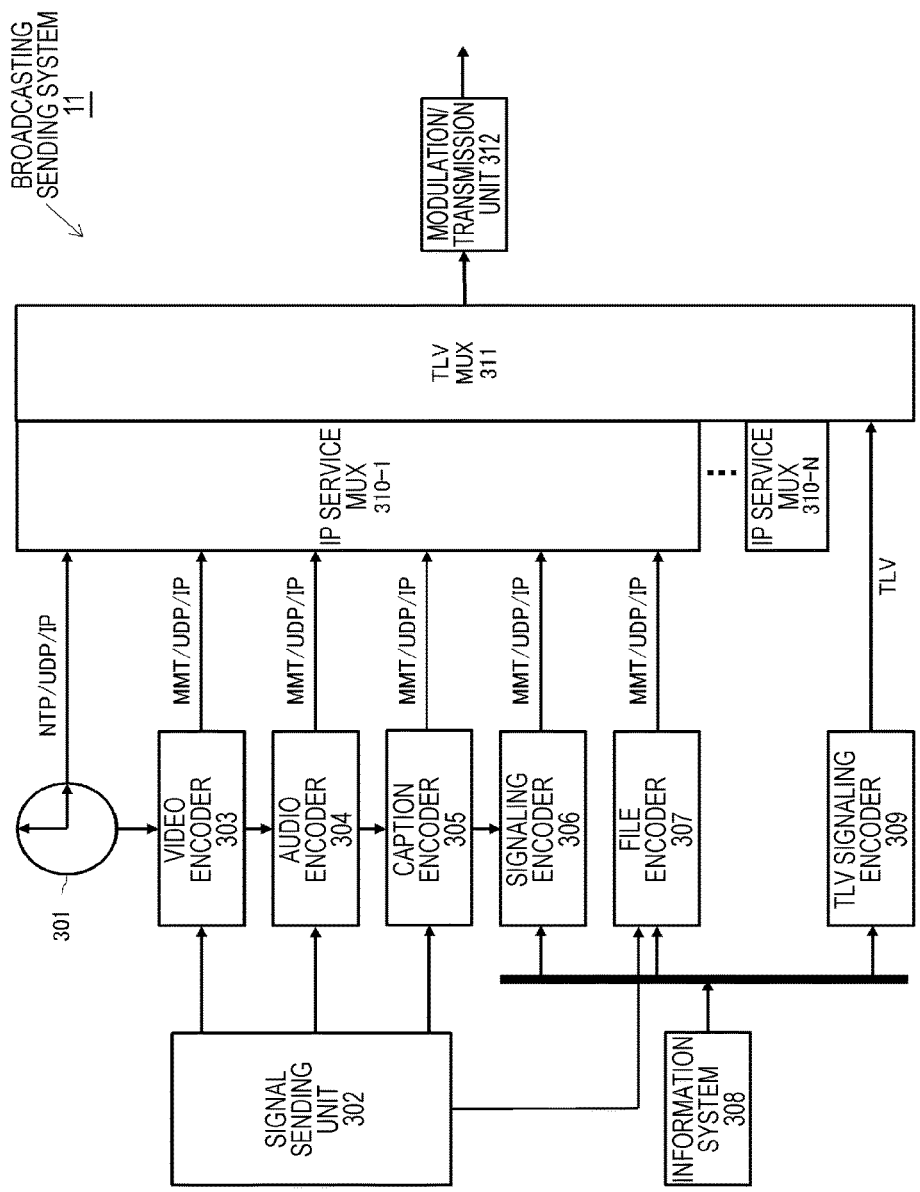
FIG. 3 is a diagram illustrating an example of a configuration of a broadcasting sending system 11 that sends the broadcasting signal illustrated in FIG. 2.

FIG. 3 illustrates an example of a configuration of the broadcasting sending system 11 that sends the broadcasting signal illustrated in FIG. 2. The illustrated broadcasting sending system 11 includes a clock unit 301, a signal sending unit 302, a video encoder 303, an audio encoder 304, a caption encoder 305, a signaling encoder 306, a file encoder 307, an information system 308, a TLV signaling encoder 309, IP service multiplexers (MUX) 310, a TLV multiplexer (MUX) 311, and a modulation/transmission unit 312.

The clock unit 301 generates time information synchronized with time information acquired from an NTP server (not illustrated), and sends an IP packet including this time information to the IP service multiplexer 310.

The signal sending unit 302 is, for example, a studio or a recording and reproduction device such as a VTR of a TV broadcasting station, and sends each piece of stream data such as a video, audio, or captions that are timed media or file data such as HTML document data for data broadcasting that is non-timed media to the video encoder 303, the audio encoder 304, the caption encoder 305, and the file encoder 307. In addition, the information system 308 is a scheduler of a TV broadcasting system and a supply source of files, and sends HTML document data that is non-timed media, and signaling information to the file encoder 307 and the signaling encoder 306, respectively.

The video encoder 303 encodes a video signal sent from the signal sending unit 302, further packetizes the signal, and sends an IP packet including an MMT packet of the video to the IP service multiplexer 310. In addition, the audio encoder 304 encodes an audio signal sent from the signal sending unit 302, further packetizes the signal, and sends an IP packet including an MMT packet of the audio to the IP service multiplexer 310. Furthermore, the caption encoder 305 encodes a caption signal sent from the signal sending unit 302, further packetizes the signal, and sends an IP packet including an MMT packet of the caption to the IP service multiplexer 310.

The signaling encoder 306 generates a signaling message (MMT-SI) related to data broadcasting based on information sent from the information system 308, and sends an IP packet including an MMT packet in which the signaling message is arranged in its payload unit to the IP service multiplexer 310. In the present embodiment, signaling messages related to data broadcasting are broadly classified into three types of messages including PA messages, M2 section messages, and data transmission messages. In the present embodiment, information for designating compulsory cache of each file used in data broadcasting is included in a data transmission message. Details of each of the signaling messages are reserved for later description.

The file encoder 307 divides file data sent from the signal sending unit 302 or the information system 308 when necessary, thereby generates an MMT packet including the file data, and then sends an IP packet including this MMT packet to the IP service multiplexer 310. Note that the file data constitutes data broadcasting content (a data broadcasting application).

The broadcasting sending system 11 is equipped with the IP service multiplexers 310 for each channel (broadcast program) to be sent. The IP service multiplexer 310 of one channel multiplexes the IP packets of the video, the audio, the caption, the signaling message, and the file data sent from each of the encoders 303 to 307, and thereby generates TLV packets constituting one channel.

The TLV signaling encoder 309 encodes signaling information (TLV-SI) sent from the information system 308, and thereby generates TLV packets to be arranged in the payload unit.

The TLV multiplexer 311 multiplexes the TLV packets generated by each of the IP service multiplexers 310-1 to 310-N and the TLV signaling encoder 309, and thereby generates a broadcast stream.

The modulation/transmission unit 312 performs an RF modulation process on the broadcast stream generated by the TLV multiplexer 311 and then sends the result to an RF transmission path.

An operation of the broadcasting sending system 11 illustrated in FIG. 3 will be described.

The clock unit 301 generates time information synchronized with time information acquired from an NTP server, and then generates an IP packet including this time information.

A video signal sent from the signal sending unit 302 is supplied to the video encoder 303. The video encoder 303 encodes the video signal, further packetizes the signal, and thereby generates an IP packet including an MMT packet of a video. This IP packet is sent to the IP service multiplexer 310.

In addition, similar processes are also performed on an audio signal and a caption signal sent from the signal sending unit 302. Then, an IP packet including an MMT packet of audio generated by the audio encoder 304 is sent to the IP service multiplexer 310, and an IP packet including an MMT packet of the captions generated by the caption encoder 305 is sent to the IP service multiplexer 310.

In addition, the signaling encoder 306 generates a signaling message (MMT-SI) related to data broadcasting based on information sent from the information system 308, and thereby generates an IP packet including an MMT packet in which this signaling message is arranged in its payload unit. This IP packet is sent to the IP service multiplexer 310.

In addition, file data sent from the signal sending unit 302 or the information system 308 is supplied to the file encoder 307. The file encoder 307 divides the file data when necessary, thereby generates an MMT packet including the file data, and generates an IP packet including this MMT packet. This IP packet is sent to the IP service multiplexer 310.

Each of the IP service multiplexers 310 multiplexes the IP packets including the video, the audio, the captions, the signaling message, and the file data sent from the respective encoders 303 to 307, and thereby generates TLV packets constituting one channel.

The TLV signaling encoder 309 encodes signaling information (TLV-SI) sent from the information system 308, and thereby generates TLV packets to be arranged in the payload unit.

The TLV multiplexer 311 multiplexes the TLV packets generated by the IP service multiplexers 310-1 to 310-N and the TLV signaling encoders 309, and thereby generates a broadcast stream. The modulation/transmission unit 312 performs an RF modulation process on the broadcast stream generated by the TLV multiplexer 311, and the RF-modulated signal is sent to an RF transmission path.

Figure 4:
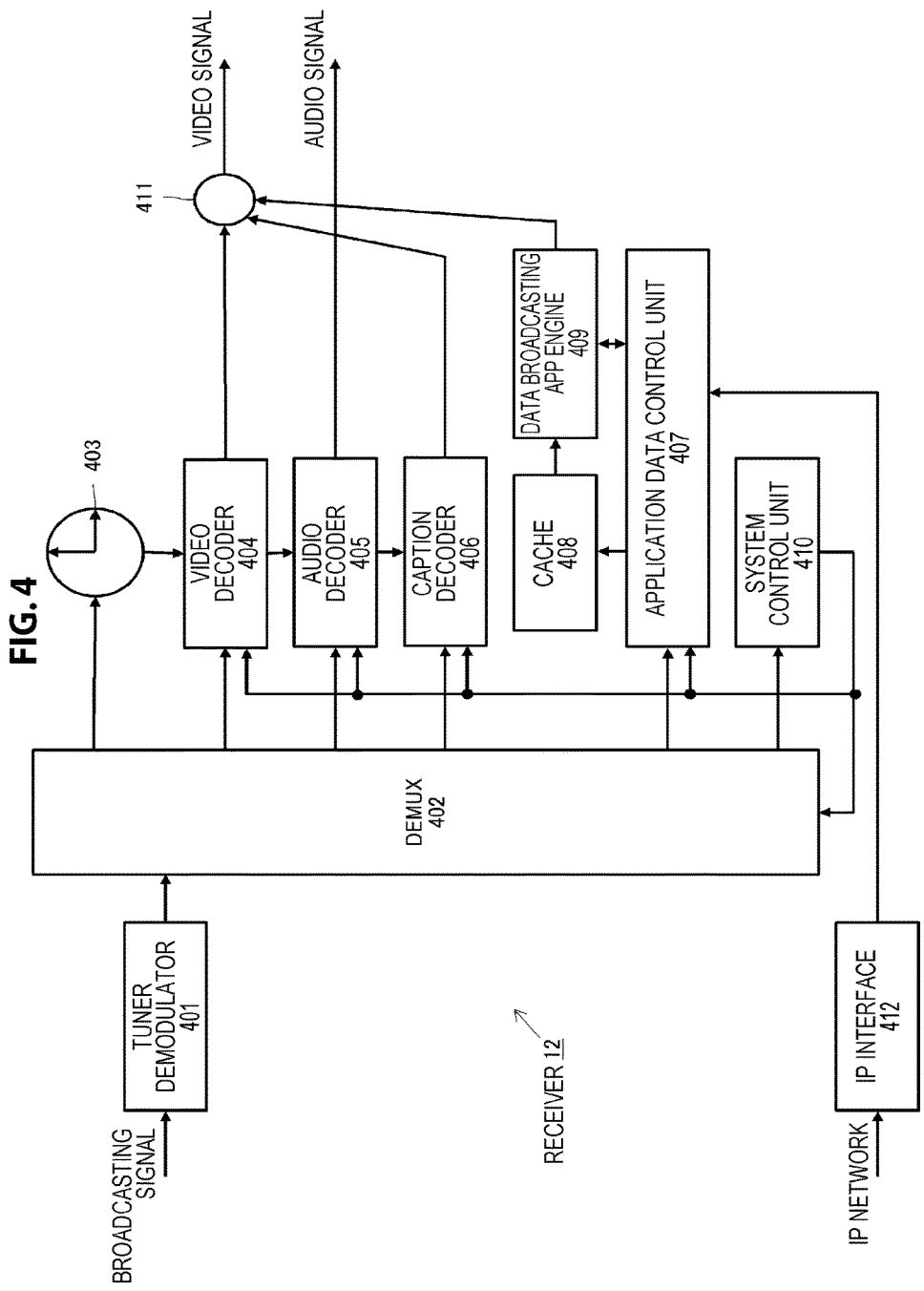
FIG. 4 is a diagram illustrating an example of a configuration of a receiver 12 that receives the broadcasting signal illustrated in FIG. 2.

In addition, FIG. 4 illustrates an example of a configuration of the receiver 12 that receives the broadcasting signal illustrated in FIG. 2. The illustrated receiver 12 includes a tuner/demodulator 401, a demultiplexer (DEMUX) 402, a clock unit 403, a video decoder 404, an audio decoder 405, a caption decoder 406, an application data control unit 407, a cache memory 408, a data broadcasting application engine 409, a system control unit 410, a synthesizing unit 411, and an IP interface 412.

The tuner/demodulator 401 receives the RF-modulated signal, performs a demodulation process thereon, and thereby obtains a broadcast stream. The demultiplexer 402 performs a demultiplexing process and a depacketizing process on this broadcast stream, and thereby outputs NTP time information, a presentation time stamp (PTS), signaling information, each of the encoded signals of the video, the audio, and the captions related to the main content of the broadcast program, the file data used in data broadcasting interoperating with the broadcast program, and the signaling information. Note that the file data used in data broadcasting is, for example, a data broadcasting application described in the form of HTML5.

The video decoder 404 decodes the encoded video signal obtained from the demultiplexer 402 to obtain a baseband video signal. In addition, the audio decoder 405 decodes the encoded audio signal obtained from the demultiplexer 402 to obtain a baseband audio signal. Furthermore, the caption decoder 406 decodes the encoded caption signal obtained from the demultiplexer 402 to obtain a caption display signal.

The application data control unit 407 performs a process on each piece of file data used in data broadcasting. In the present embodiment, each piece of file data used in data broadcasting is assumed to be transported from two systems that are a broadcasting signal and an IP network, and the application data control unit 407 acquires the former via the tuner/demodulator 401 and demultiplexer 402, and the latter via the IP interface 412. The application data control unit 407 controls a process on the acquired file data based on the signaling information output from the demultiplexer 402. Specifically, the application data control unit 407 manages a current data broadcasting presentation unit (PU), and instructs the data broadcasting application engine 409 such as an HTML browser to perform a process on the corresponding file data (a data broadcasting application of HTML5 or the like). The data broadcasting application engine 409 manages the data broadcasting application appropriately using file data cached in advance or pre-cached in the cache memory 408.

The application data control unit 407 specifies an access range necessary for presenting data broadcasting with reference to a signaling table included in each of a PA message, an M2 section message, and a data transmission message, and controls a filtering operation for caching file data that can be cached in the cache memory 408 beforehand by the data broadcasting application engine 407. Details of the caching of the file data beforehand are reserved for later description.

In addition, information for designating compulsory cache of each file to be used in data broadcasting is included in a data transmission message. In the present embodiment, the application data control unit 407 pre-caches file data necessary for presenting data broadcasting in a timely manner in the cache memory 408 based on the compulsory cache information included in the data transmission message. Details of the pre-caching of the file data are reserved for later description.

Note that file data of the same content is repetitively sent in broadcast streams. The system control unit 410 controls a filtering operation of the demultiplexer 402 to help the application data control unit 407 acquire data necessary only for the demultiplexer 402 from a group of repetitively sent file data.

The system control unit 410 controls operations of respective units of the receiver 12 based on the signaling information obtained from the demultiplexer 402, operation information from a user via a user operation unit (not illustrated) or the like. The clock unit 403 generates time information synchronized with NTP time information obtained from the demultiplexer 402 based on the time information.

In addition, the system control unit 410 controls decoding timings of the decoders 404 to 406 based on PTSs to adjust presentation timings of videos, audio, and captions. The synthesizing unit 411 synthesizes the baseband video signal with the caption display signal and the data broadcasting display signal to obtain a video signal for video display. In addition, the baseband audio signal obtained from the audio decoder 405 turns into an audio signal for audio output. The main content of a broadcast program constituted by the video signal and the audio signal is output with videos and sounds from a monitor or a display that is not illustrated. In addition, data broadcasting processed by the data broadcasting application engine 409 is also displayed superimposed on the screen of the main content of the broadcast program on the monitor or the display.

An operation of the receiver 12 illustrated in FIG. 4 will be described.

The tuner/demodulator 401 receives an RF-modulated signal, performs a demodulation process thereon, and thereby obtains a broadcasting stream. The demultiplexer 402 performs a demultiplexing process and a depacketizing process on this broadcast stream to extract NTP time information, a PTS, signaling information, each of encoded signals such as video, audio, and captions, and file data.

The NTP time information extracted by the demultiplexer 402 is sent to the clock unit 403. The clock unit 403 generates time information synchronized with the NTP time information based on the time information. That is, the clock unit 403 generates time information that matches the time information generated by the clock unit 301 of the broadcasting sending system 11.

The encoded video signal extracted by the demultiplexer 402 is sent to the video decoder 404 to be decoded, and thereby a baseband video signal is obtained. In addition, the encoded caption signal extracted by the demultiplexer 402 is sent to the caption decoder 406 to be decoded, and thereby a caption display signal is obtained. In addition, the file data extracted by the demultiplexer 402 is sent to and processed by the data broadcasting application engine 407, and thereby a data broadcasting display signal is obtained. Note that the system control unit 410 controls a filtering operation by the demultiplexer 402 to cause the demultiplexer 402 to acquire only necessary file data.

Then, the synthesizing unit 411 synthesizes the baseband video signal, the caption display signal, and the data broadcasting display signal to obtain a video signal for video display.

In addition, the encoded audio signal extracted by the demultiplexer 402 is sent to the audio decoder 405 to be decoded, and thereby a baseband audio signal for audio output is obtained. The main content of a broadcast program constituted by the video signal and the audio signal is output with videos and sounds from a monitor or a display that is not illustrated.

Meanwhile, the application data control unit 407 manages a current data broadcasting presentation unit, and instructs the data broadcasting application engine 409 such as an HTML browser to perform a process on the corresponding file data (a data broadcasting application of HTML5 or the like). The data broadcasting application engine 409 manages the data broadcasting application appropriately using file data cached in advance or pre-cached in the cache memory 408. The data broadcasting processed by the data broadcasting application engine 409 is also displayed superimposed on the screen of the main content of the broadcast program on the monitor or the display.

In addition, the application data control unit 407 controls pre-caching of the file data according to an available capacity of the cache memory 408 or compulsory cache for presenting data broadcasting interoperating with a broadcast program in a timely manner with reference to signaling tables included in each of a PA message, an M2 section message, and a data transmission message (to be described below).

Figure 5:
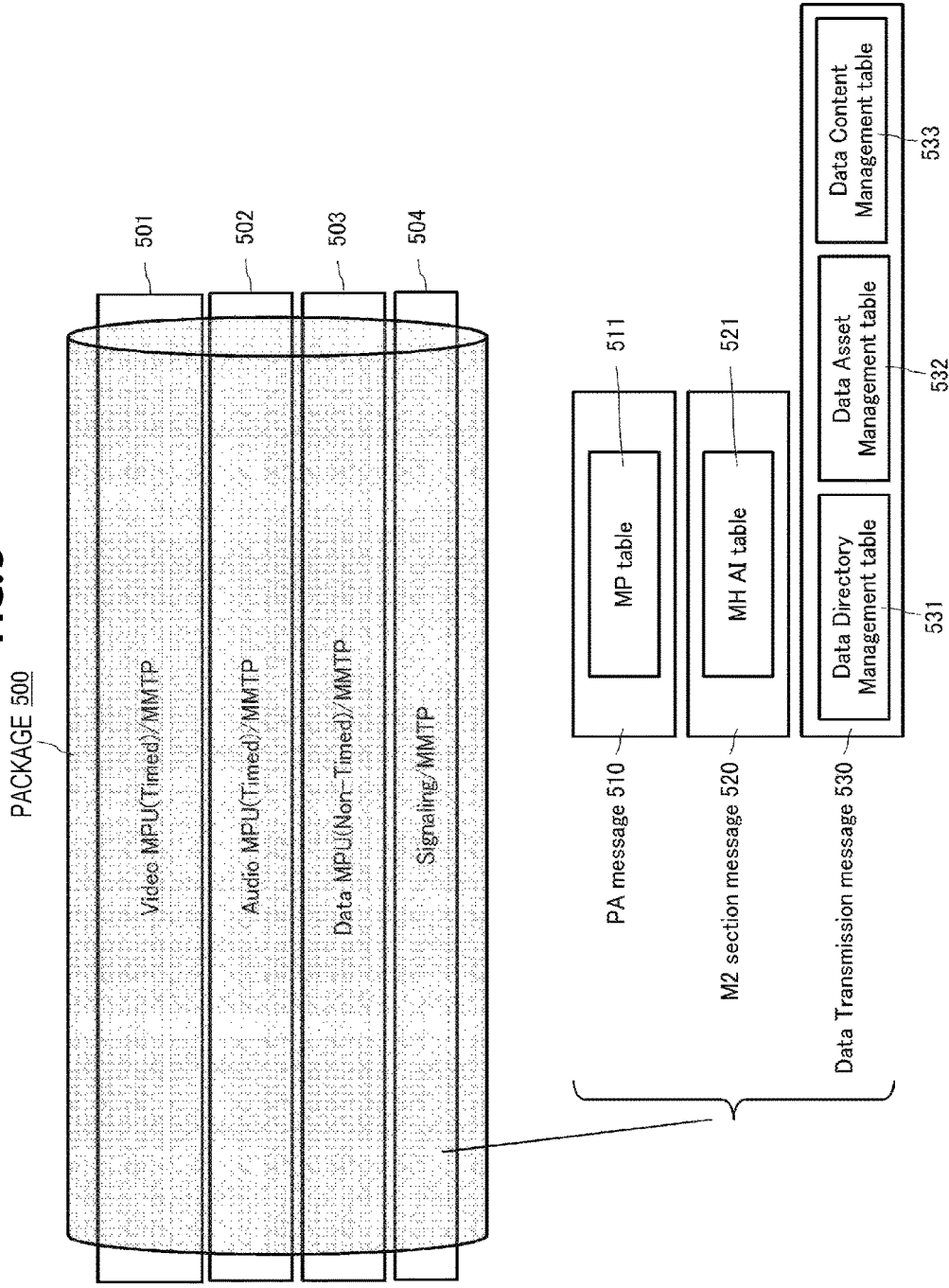
FIG. 5 is a diagram illustrating an image of a broadcasting signal (package) 500 sent from the broadcasting sending system 11 on an RF transmission path according to the MMT method.

In the digital broadcasting system 10 illustrated in FIG. 1, MMT is assumed to be applied as a transport method used when a broadcasting signal is transported from the broadcasting sending system 11 to the receiver 12. FIG. 5 illustrates an image of a broadcasting signal 500 sent from the broadcasting sending system 11 on an RF transmission path according to the MMT method.

A broadcasting signal of one channel (a broadcast program) is constituted by timed media related to the main content of the broadcast program such as videos, audio, captions, and the like, and non-timed media such as file data to be used in data broadcasting interoperating with the broadcast program, and such encoded media data is stored in an MPU and transported. In addition, information related to transport control of the broadcasting signal is transported as signaling information. In MMT, it is easy to use data of timed media and non-timed media constituting one channel (a broadcast program) on a combination of different transmission paths. In the example illustrated in FIG. 5, MMT transmission paths 501 to 504 are used for each type of data such as video, audio, captions, file data, and signaling information as the broadcasting signal 500. Note that a transmission path for caption data is not illustrated in the drawing for the sake of convenience.

One channel (a broadcast program) can be called a "package" constituted by different types of a plurality of assets such as videos, audio, captions, and file data (a data application) (a package is a logical set of media data transported on an MMT transmission path). Each asset is a set of one or more MPUs (a logical group) sharing the same asset_id (asset identifier), and is transported on a dedicated elementary stream (ES), i.e., an MMT transmission path (an asset is associated with a unique identifier, and is a data entity to be used for constructing presentation of multimedia). In other words, MMT packets (MMTPs) of a video constituted by an MPU logical group having a shared asset_id are transported on the transmission path 501, MMT packets of audio constituted by an MPU logical group having a shared asset_id are transported on the transmission path 502, and MMT packets of file data constituted by an MPU logical group having a shared asset_id are transported on the transmission path 503. An MPU is specified with asset_id and a sequence number of an MPU on a corresponding transmission path. In addition, an MMT transmission path on which each type of media is transported can be identified with asset_id.

In other words, a plurality of assets (i.e., having different asset_ids) of the same type can be transported in one package (a broadcast program). For example, there is a case in which two or more pieces of file content (data broadcasting applications) are provided for the same broadcast program. In such a case, different asset_ids are assigned to different pieces of file content, and the content is transported on different MMT transmission paths as different MPU logical groups. In FIG. 5, only one transmission path 503 for file data is illustrated for the sake of simplicity.

In addition, MMT can be used in common for a plurality of transmission paths for broadcasting and communication. Non-timed media such as HTML document data can be transported on a transmission path for broadcasting along with timed media as illustrated in FIG. 5, and can be provided via a transmission path for communication such as an IP network.

In addition, MMT packets including the same signaling message are repetitively transported on the transmission path 504. To realize the technology disclosed in the present specification, the transported signaling message relates to three types of signaling messages including a PA message 510, an M2 section message 520, and a data transmission message 530. These various signaling messages transport signaling tables. The PA message 510 includes, for example, an MMT Package (MP) table 511. In addition, the M2 section message 520 includes an MH Application Information (AI) table 521. Furthermore, the data transmission message 530 is a message for giving a notification of a data transport method or a data management control method, and includes signaling tables including a data directory management table 531, a data asset management table 532, and a data content management table 533. Details of the tables are reserved for later description.

Figure 6:
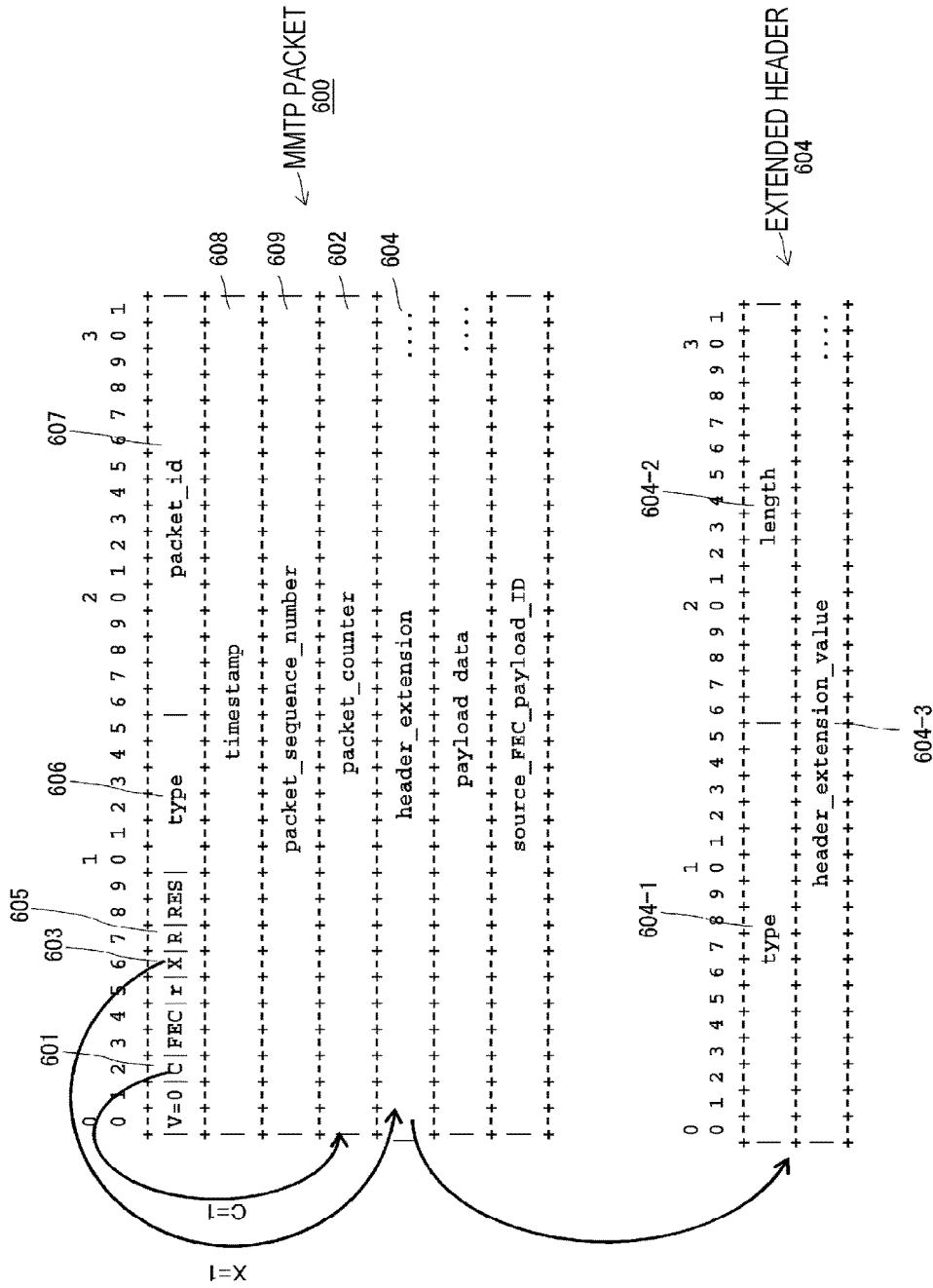
FIG. 6 is a diagram illustrating an example of a configuration of a header of an MMT packet.

As described above, timed media such as videos, audio, and captions and non-timed media such as file data are transported in MMTPs. FIG. 6 illustrates an example of a configuration of an MMTP packet 600. The MMTP packet is a unit of media data formatted to be transported using the MMT protocol. For example, Non-Patent Literature 1 may be referred to for more detail.

If a packet counter flag "C" indicated by reference numeral 601 is substituted with 1, the field of a packet counter indicated by reference numeral 602 is indicated as being present in this MMTP packet. The packet counter 602 is a 32-bit-long field in which an integer value obtained by counting MMTP packets is written, and the value increments by 1 each time an MMTP packet is transmitted.

If an extension flag "X" indicated by reference numeral 603 is substituted with 1, an extended header 604 indicated by reference numeral 604 is indicated as being present. An example of a configuration of the extended header 604 is also illustrated in the lower part of FIG. 6. The extended header 604 is constituted by a 16-bit-long type field indicated by reference numeral 604-1, a length field indicated by reference numeral 604-2, and a header_extensin_value field indicated by reference numeral 604-3. A byte length of the header_extensin_value field is written in the length field. Extension information different from specifications of MMT can be written in the header_extensin_value field.

A type value indicating a type of payload data of a corresponding MMTP packet is written in a type field indicated by reference numeral 606. Definitions of type values are as shown in Table 1 below.

TABLE 1

| Value | Data type | Definition of data unit |
|---|---|---|
| 0x00 | MPU | a media-aware fragment of the MPU |
| 0x01 | Generic object | A generic object such as a complete MPU or an object of another type |
| 0x02 | Signaling message | one or more signaling messages or a fragment of a signaling message |
| 0x03 | Repair symbol | a single complete repair symbol |

If a random access point (RAP) flag indicated by reference numeral 605 is substituted with 1, it indicates that the payload of a corresponding MMTP packet includes a random access point of a data stream of a corresponding data type.

An integer value for distinguishing an asset is written in a 16-bit-long packet_id field indicated by reference numeral 607. A value of this field is derived from asset_id of an asset to which a corresponding MMTP packet belongs. Mapping of packet_id and asset_id is shown in an MMT package (MP) table that is a part of a signaling message.

A transmission time of the corresponding MMTP packet is described in a 32-bit-long timestamp field indicated by reference numeral 608 in a short-format stipulated in an NTP protocol.

An integer value for identifying a packet having the same packet_id (a sequence number on an MMT transmission path) is described in a 32-bit-long packet_sequence_number field indicated by reference numeral 609.

Figure 7:
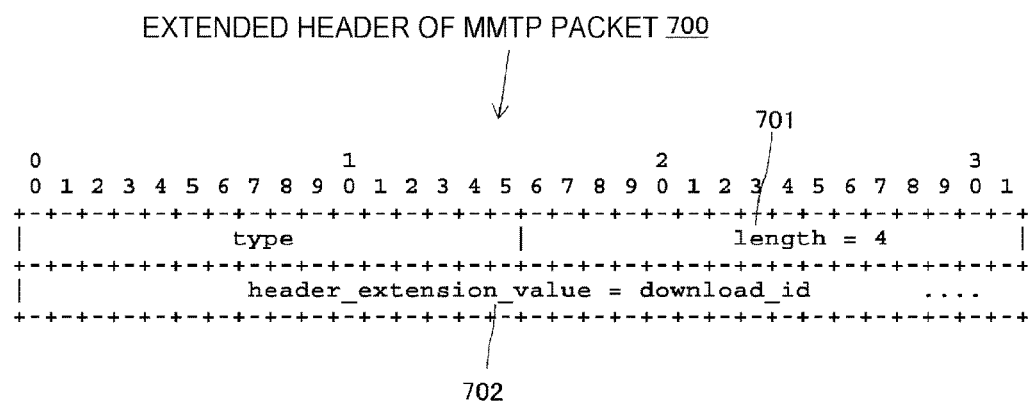
FIG. 7 is a diagram illustrating an example of a configuration of an extended header 700 of an MMTP packet on which non-timed media is transported.

FIG. 7 illustrates an example of a configuration of an extended header 700 of an MMTP packet on which non-timed media is transported. As illustrated, 4 is written in a length field 701 as a byte length of a header_extensin_value field in this case. Download_id is described in 4 bytes in a header_extensin_value field 702.

When an MPU is transported using the MMT protocol, it is necessary for a transmission and a reception side to perform packetization and depacketization. Through packetization, the MPU is inserted into the MMTP payload, and transported in MMTP packets. A format of the MMTP payload allows fragmentation of the MMTP payload so that a large payload can be transported. In addition, the format of the MTP payload corresponds to a small data unit, and thus also allows aggregation in which a plurality of MMTP payloads are inserted into a single MMTP payload. The reception side performs depacketization to restore original MPU data.

Figure 8:
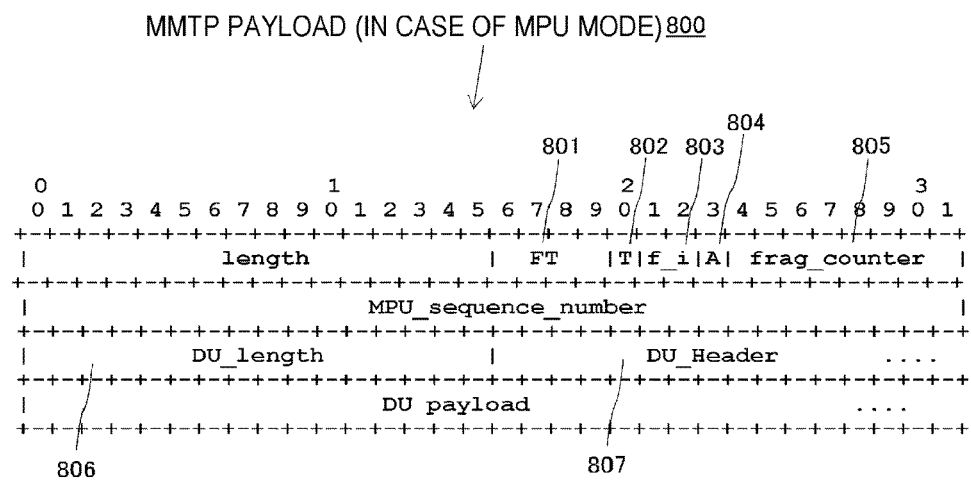
FIG. 8 is a diagram illustrating an example of a configuration of an MMTP payload 800 in an MPU mode.

FIG. 8 illustrates an example of a configuration of an MMTP payload 800 in an MPU mode. For example, Non-Patent Literature 1 may be referred to for more detail. The MPU mode is a case in which "0x00" is written in the type field 606 of the MMTP header. MMTP packets of the MPU mode are used in transporting videos and audio related to the main content of a broadcast program and file data interoperating with the broadcast program (a data broadcasting application).

A type of a fragment is indicated in an MPU fragment type (FT) field indicated by reference numeral 801 with a 4-bit value. Definitions of FT values are as shown in Table 2 below.

TABLE 2

| FT | Description | Content |
|---|---|---|
| 0 | MPU metadata | contains the ftyp, mmpu, moov, and meta boxes as well as any other boxes that appear in between. |
| 1 | Movie fragment metadata | contains the moof box and the mdat box, excluding all media data inside the mdat box. |
| 2 | MFU | contains a sample or sub-sample of timed media data or an item of non-timed media data. |

When 1 is written in a timed (T) flag indicated by reference numeral 802, it indicates that an MPU transporting timed media has been fragmented, and when 0 is written, it indicates that an MPU transporting non-timed media has been fragmented.

A fragmentation identifier (f_i) field indicated by reference numeral 803 indicates information related to fragmentation of a data unit inside a payload in 2 bits Definitions of 4 values of f_i are as shown in Table 3 below.

TABLE 3

| Value | Definition of data unit |
|---|---|
| 00 | Payload includes integer number of data units. |
| 01 | Payload includes data units of first fragment. |
| 10 | Payload includes data units of middle fragment. |
| 11 | Payload includes data units of last fragment. |

When the payload aggregates a plurality of data units, 1 is written in an aggregation (A) flag indicated by reference numeral 804.

The number of payloads of which the MMTP payloads continuously include fragments of the same data units is described in an 8-bit-length fragment counter field indicated by reference numeral 805.

A 16-bit-length DU_length field indicated by reference numeral 806 has a length of data (Data unit or DU) following the field. However, when the A flag 804 is 0, the DU_length field 806 is not presented.

A DU_Header indicated by reference numeral 807 is a header of a data unit. However, when the FT value 801 is 0 or 1 (in other words, when the type is not an MFU), the DU_Header 807 is not presented. The MFU includes a sample or a sub-sample of timed media, or an item of non-timed media.

FIG. 9 illustrates an example of a configuration of DU_Header 900 of an MFU in which timed media are disposed in a payload. In addition, FIG. 10 illustrates an example of a configuration of DU_Header 1000 of an MFU in which non-timed media are disposed in a payload. As illustrated in FIG. 10, DU_Header 1000 in the case of non-timed media includes a 32-bit-long item_ID that is an identifier of an item transported as a part of the MFU. The item is a resource constituting an application such as HTML document data or monomedia data referred to from an HTML document. The item can be uniquely specified on an MMT transmission path designated with asset_id with combinations of packet_id of the header of the above described MMTP packet, download_id of the extended header, and item_ID of the DU header.

Figure 11:
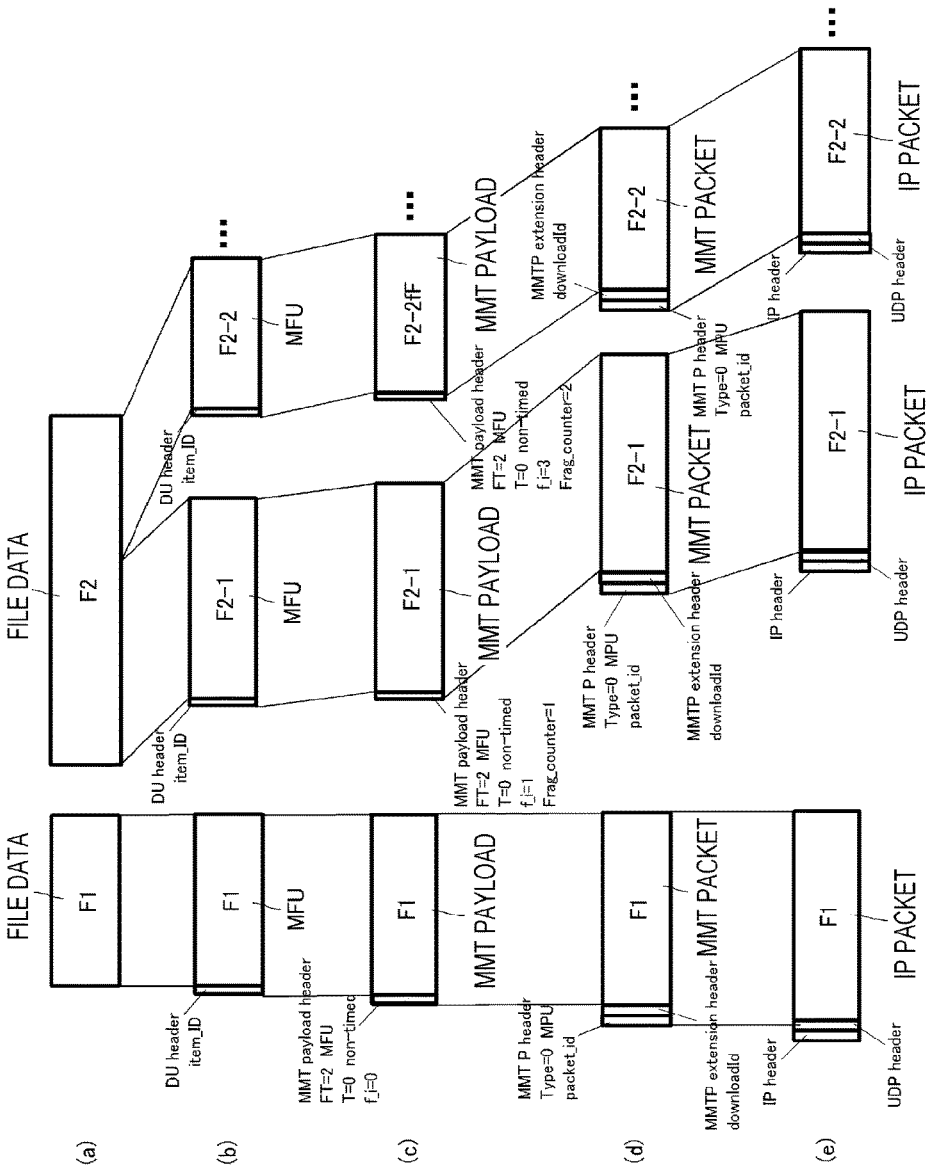
FIG. 11 is a diagram illustrating an example of a packet configuration when data of non-timed media is transported.

FIG. 11 illustrates an example of a packet configuration when data of non-timed media is transported.

FIG. 11 (a) illustrates a state of original file data. In the drawing, each of F1 and F2 is one piece of file data. The file data is, for example, an HTML document, which includes one or more items. In addition, the HTML document itself is also one item.

FIG. 11 (b) illustrates a state in which pieces of file data F1 and F2 are disposed in MFUs. The file data F1 does not have a large file size, and thus it is disposed in a payload of one MFU as it is. On the other hand, since the file data F2 has a large file size, it is divided into plural pieces, and each is disposed in a payload of an MFU. In the illustrated example, the file data F2 is divided into two pieces that are F2-1 and F2-2, and they are disposed in payloads of different MFUs.

Here, DU_Headers (see FIG. 10) in which item_ID uniquely indicating the time is described are given to the MFUs of which payloads have non-timed media such as HTML document data or monomedia.

Next, as illustrated in FIG. 11(c), a header of an MMT payload (see FIG. 8) is attached to each MFU, and thereby an MMT payload is formed. Here, a value 2 is described in a Fragment Type (FT) field of the header of the MMT payload, indicating that the type of fragment is MFU. In addition, a value 0 is described in a Timed (T) flag, indicating that it is an MPU transporting non-timed media. Furthermore, a value 0 is described in a Fragmentation Identifier (f_i) field of an MFU in which non-timed media that is not fragmented is disposed. On the other hand, a value 1 is described in a Fragmentation Identifier (f_i) field of an MFU in which fragmented non-timed media is disposed, and a corresponding count value is described in the fragment-_counter field.

Next, as illustrated in FIG. 11 (d), a header of an MMTP packet and an extended header (see FIG. 6) are attached to each MMT payload, and thereby an MMT packet stream is formed. Here, 0 is described in a type field of the MMTP header to describe that the type of payload data is MPU, and an integer value for distinguishing an asset is written in the packet_id field. In addition, download_id is described in the extended header. Thus, items can be uniquely specified with combinations of packet_id in the header of the MMTP packet and download_id in the extended header and item_ID in the DU header on an MMT transmission path designated as asset_id.

Furthermore, as illustrated in FIG. 11(e), an IP header and a UDP header are attached to each MMT packet, and thereby an IP packet stream is formed. Although not illustrated, a TLV packet constituting a broadcast stream is generated by attaching a TLV header to each IP packet.

Note that, although not illustrated in FIG. 11, MMT packets include an MMT packet of which the payload includes a signaling message (MMT-SI). The signaling message includes a PA message, an M2 section message, and a data transmission message (refer to the above description and FIG. 5). Whether an MMTP payload includes transport media, such as timed media or non-timed media, or a signaling message can be identified with reference to a value of the type field in the MMTP header.

Next, a configuration of a signaling message that is related to realization of the technology disclosed in the present specification to be used in an MMT protocol will be described. A signaling message is signaling information necessary for transport control of a package or use of a package, and transports various kinds of signaling tables.

A signaling message of MMT uses a general format constituted by three common fields, one specific field for each signaling message type, and a message payload. The message payload transports signaling information. Hereinafter, a PA message, an M2 section message, and a data transmission message will be described in this order.

Figure 12:
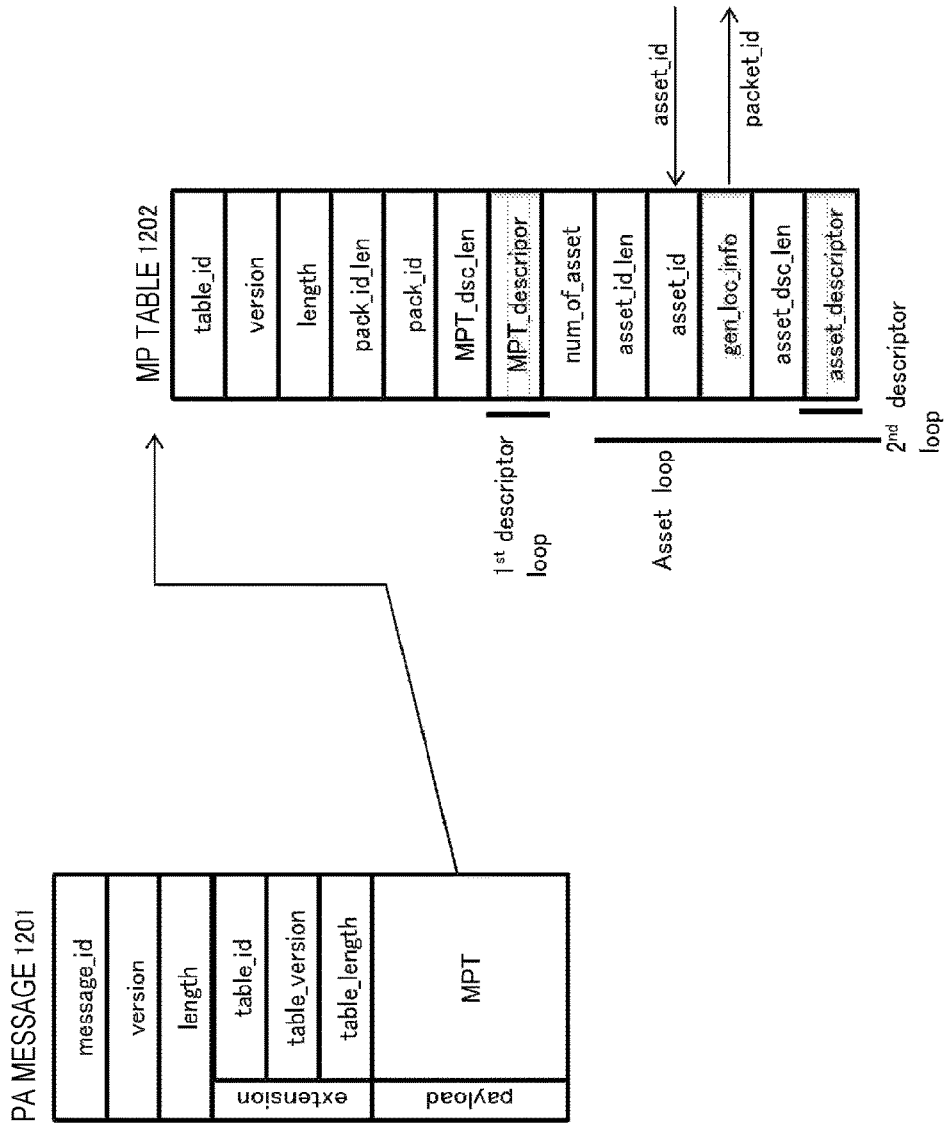
FIG. 12 is a diagram illustrating an example of a configuration of a PA message 1201 and an MP table 1202 included in the PA message.
Figure 13:
FIG. 13 is a diagram illustrating an example of syntax of a PA message 1300.

A Package Access (PA) message transports a PA table having information of all signaling tables necessary for Package Access. A PA table includes an MMT Package (MP) table. FIG. 12 illustrates an example of a configuration of a PA message 1201 that is one of signaling messages and an MP table 1202 included in the PA message. In addition, FIG. 13 illustrates an example of syntax of a PA message 1300, and FIG. 14 shows description of parameters included in the PA message.

Message_id is a 16-bit fixed value for identifying the PA message among various kinds of signaling information. Version is an 8-bit integer-value parameter indicating a version of the PA message. When at least some parameters included in the MP table have been updated, for example, the value of version increments by 1. Length is a 32-bit-long parameter indicating a size of the PA message in units of bytes counted from immediately after this field.

Index information of the MP table (MPT) disposed in the payload field is disposed in an extension field. 8-bit table_id, 8-bit table_version, and 16-bit table_length are disposed in this field. Table_id is a fixed value for identifying the MP table. Table_version indicates a version of the MP table. Table_length indicates a size of the MP table in units of bytes.

The MP table is disposed in the payload field of the PA message. The MP table stores information related to a package including a list of all assets FIGS. 15 and 16 illustrate examples of syntax of the MP table (FIG. 16 is a second half of FIG. 15). In addition, FIG. 17 shows description of parameters included in the MP table. A configuration of the MP table will be described below.

Table_id is an 8-bit fixed value for identifying an MP table among various kinds of signaling information. Version is an 8-bit integer value indicating a version of the MP table. When at least some parameters included in the MP table have been updated, for example, the value of version increments by 1. Length is a 32-bit-long parameter indicating a size of the MP table in units of bytes counted from immediately after this field.

MMT_package_id is identification information of a whole package having assets such as signals (videos, audio, captions) transported in broadcasting signals and file data as constituent elements. This identification information is text information. MMT_package_id_length indicates a size of the text information in units of bytes.

An MP_table_descriptors field is a storage area of descriptors related to the whole package. MPT_table_descriptor_length is a 16-bit-long parameter indicating a size N2 of this field in units of types. In addition, MP_table_descriptor is assumed to be disposed in N2 bytes (one or more than one descriptor is disposed) with descriptors stipulated for various purposes.

Number_of_assets is an 8-bit parameter indicating the number of assets (signals, and files) serving as elements constituting the package. The same number of following asset loops as number_of_asset (N3) are set.

Parameters including asset identification information (asset_id) as information of individual assets, general location information (gen_loc_info), and an asset descriptor (asset_descriptor) are disposed in one asset loop.

Identifier_type indicates an ID system of an MMTP packet flow. When it is an ID system indicating asset_id, 0x00 is set. Asset_id scheme indicates a format of asset_id, and asset_id_length indicates a length of asset_id. In addition, asset identification information (asset_id) is indicated in a loop of asset_id_byte in units of bytes. Asset_id is text information for identifying an asset as a unit. In addition, asset_type indicates a character string representing a type of asset. Asset_clock_relation_flag is a flag indicating presence of a clock information field of an asset. When the flag is 1, there are clock information identification field (asset_clock_relation_id) and timescale flag field (asset_timescale_flag), and when it is 0, none of the fields are present. In addition, in a field of asset_location, the number of pieces of location information of an asset is designated in location_count, and the following loop of location information shows the same number of pieces of location information of an asset (MMT_general_location_info) as the designated location information. In the present embodiment, the location information of the asset is described in a form of a packet ID of a transmission path which is an acquisition source of the asset. Thus, drawing asset_id from the MT table, a corresponding packet ID of an MMT transmission path can be extracted.

The field of asset_descriptor is a storage area of descriptors related to assets. Asset_descriptor_length indicates a size N5 of the field of asset_descriptor in units of bytes. In addition, N5 (one or more than one) asset_descriptor is assumed to be disposed with descriptors stipulated for various purposes.

An M2 section message is a signaling message to be used for transporting a section extension format of an MPEG-2 System as it is. FIG. 18 illustrates an example of a configuration of an M2 section message 1800. Semantics of parameters of the M2 section message will be described below.

Message_id (identification of the message) is a 16-bit fixed value for identifying the M2 section message among various kinds of signaling information, and is set to 0x8000 in the present embodiment. Version (a version) is an 8-bit integer-value parameter indicating a version of the M2 section message. Length (a length of the message) is a 16-bit-long parameter indicating a size of the M2 section message counted from immediately after this field in units of bytes. Table_id (identification of a table) is an area to be used for identifying a table to which the section belongs. Section_syntax_indicator (a section syntax indicator) is set to "1" indicating an extension format. Section_length (a length of the section) is an area in which the number of bytes of data following the section length area is written. Table_id_extension (table identification extension) is an area for extending table identification. Version_number (a version number) is an area in which a version number of the table is written. Current_next_indicator (current/next indication) is set to "1" when the table is currently available, and is set to "0" when the table is currently not available and will be effective next. Section_number (a section number) is an area in which a section number constituting the table is written. Last_section_number (a last section number) is an area in which a last section number constituting the table is written. Cyclic redundant coding is performed according to CRC32 (CRC) and ITU-T Recommendation H.222.0.

FIG. 19 illustrates an example of a configuration of an MH Application Information (AI) table (MH AIT) 1900 transported in the M2 section message. Semantics of parameters of the MH AI table will be described below.

Table_id (identification of the table) is an 8-bit fixed value for identifying an application information (AI) table among various kinds of signaling information, and is set to 0x89 in the present embodiment. Section_syntax_indicator (indication of section syntax) is a 1-bit field, and is set to "1" at all times. Section_length (a length of the section) is a 12-bit field, and is set to "00" for the leading two bits at all times. This stipulates the number of bytes of the section from the field of the length of the section to the end of the section including CRC32. This value is set not to exceed 1021 (0x3FD in hexadecimal notation). Application_type (a type of an application) is a 16-bit field, indicating a value of an application transported in the AIT. In DVB, 0x0001 is allocated for a DVB-J application. 0x0001 is set for an ARIB-J application. Version_number (a version number) is a 5-bit field, indicating a version number of a sub table. Version_number is a version number of the MH AI table, and increments by 1 when there is a change in information of the sub table. In addition, when the value of the version number is "31," the next value returns to "0." Current_next_indicator (current/next indication) is set to "1" at all times. Section_number (a section number) is an 8-bit field, indicating a section number. The section number of a first section in the sub table is 0x00. The section number increments by 1 each time a section having the same table identification and application type is added thereto. Last_section_number (a last section number) is an 8-bit field, stipulating the last section number in a sub table to which the section belongs.

Common_descriptor_length (a common descriptor loop length) is an 8-bit field, stipulating a length of bytes of a succeeding descriptor (a descriptor in a description area). This descriptor (a descriptor in a description area) stores information of the descriptor in a series of areas constituted by the same number of loops as common_descriptor_length. The descriptor in this common descriptor area is applied to all applications in an AIT sub table. For example, a transport protocol descriptor designating a transport method or an acquisition location of an application is written in the descriptor field.

Application_loop_length is an area in which the number of pieces of application information included in this MH AI table is written. The same number of loops of the application information as indicated by application_loop_length are set.

In one loop of the application information, descriptors (application information descriptors) described in a series of areas constituted by the same number of loops as the number of application_identifier (application identifier), application_control_code (application control code), and application_descriptor_loop_length (application information descriptor loop length) are disposed. The descriptors in the descriptor areas are applied only to designated applications.

Application_identifier (application identifier) is a parameter for identifying an application. Application_control_code (application control code) is an 8-bit field, stipulating a control code controlling a state of the application. Semantics of this field depend on a value of application type. If "autostart" is instructed as application_control_code, the receiver referring to this MH AT table starts the application designated in application_identifier. In addition, if "prefetch" is instructed as application_control_code, the receiver referring to this MH AT table performs advance reading of the application designated in application_identifier. Furthermore, if "kill" is designated as application_control_code, the receiver referring to this MH AT table stops execution of the application designated in application_identifier. Cyclic redundant coding is performed according to CRC32 (CRC) and ITU-T Recommendation H.222.0.

In short, the MH AI table is a table designating a processing method of an application (file data) sent on an MMT transmission path, a transport method (transport_protocol), and a location (URL). When the receiver receives the MH AI table sent in an M2 section message, the receiver acquires an application with designated transport_protocol from a designated location to execute a process designated in application_control_code.

FIG. 20 illustrates an example of a configuration of an application information descriptor 2000 stored in a loop of application information of the MH AI table. In addition, FIG. 21 shows description of parameters included in the application information descriptor 2000. Semantics of the parameters of the application information descriptor 2000 will be described.

Descriptor_tag is an 8-bit integer value for identifying the descriptor 2000. Descriptor_length is an area in which the number of bytes of data of the descriptor 2000 following this field is written.

Information of application_profile is written in a series of areas constituted by the same number of loops as the number of application_profile_length. Application_profile is a profile of the receiver that can execute the present application, indicating a requested function that is a function requested from the receiver in a bitmap. Its high-order 3 bits indicate function bitmap switching. The bitmap is stipulated in each version. In addition, version_major, version_minor, and version micro are each versions stipulated in the application profile.

Service_bound_flag is a flag indicating whether or not the present application is effective only in a current service. Visibility indicates whether or not the application is visible. Application_priority is a relative priority in applications notified of in this service. Transport_protocol_label indicates a protocol transporting the application. As a value of transport_protocol_label, 0x0003 indicates HTTP/HTTPS transport, and 0x0005 indicates MMT and non-timed transport.

Figure 22:
FIG. 22 is a diagram illustrating an example of a configuration of a transport protocol descriptor 2200.

In addition, FIG. 22 illustrates an example of a configuration of a transport protocol descriptor 2200 stored as a shared descriptor in the application information of the MH AI table. Semantics of parameters of the transport_protocol descriptor 2200 will be described below.

Descriptor_tag is an 8-bit integer value for identifying the descriptor 2200. Descriptor_length is an 8-bit area in which the number of bytes of data of the descriptor 2200 following this field is written.

Protocol_id (protocol identifier) indicates a protocol transporting an application. As its value, 0x0003 indicates HTTP/HTTPS transport, and 0x0005 indicates MMT and non-timed transport. Transport_protocol_label (transport protocol_label) is a value for uniquely identifying a transport means when one application is transported on a plurality of paths, and corresponds to the field having the same name of the application information descriptor. Selector_byte (selector byte) is an area in which syntax is stipulated for each protocol ID, and an acquisition location is written.

FIG. 23 illustrates an example of a configuration of a selector byte 2300 common to HTTP/HTTPS, MMT non-timed transport.

URL_base_byte stores text information indicating URL_base among URL character strings in a series of areas constituted by the same number of loops as a number of URL_base_length.

URL_extension_count indicates the number of URL_extension following URL_base, in which loops of the same number of URL_extension as a number of URL_extension_count are set. In addition, in one loop of URL_extension, URL_extension_byte stores text information indicating individual URL_extension in a series of areas constituted by the same number of loops as a number of URL_extension_length stipulating a length of URL_extension. Each URL_extension is a URL character string following URL_base. If URL_base is "http://www.xbc.com" and URL_extension is "index.html," for example, these character strings are joined, and thereby a complete URL "http://xbc.com/index.html" can be obtained.

In short, with reference to application information descriptors and transport protocol descriptors in loops of the application information of the MH AI table, a transport means (whether it is MMT transport or HTML transport) and location information (URL) of applications can be acquired.

Figure 24:
FIG. 24 is a diagram illustrating an example of a configuration of a data transmission message that is one of signaling messages.

FIG. 24 illustrates an example of a configuration of a data transmission message 2400 that is one of signaling messages. Semantics of parameters of the data transmission message will be described below.

Message_id (message identification) is a 16-bit fixed value for identifying a data transmission message among various kinds of signaling information, and is set to 0xF000 in the present embodiment. Version (a version) is an area in which a version number of the data transmission message is written. Length (a length of the message) is a 32-bit parameter indicating a size of data of the message following this field in units of bytes.

Num_of_tables (the number of tables) indicates the number of tables stored in this data transmission message. The same number of loops of table information as indicated by num_of_tables as tables stored in the data transmission message are set.

In one loop of table information, table_id (table identification), table_version (a version of a table), and table_length (a length of a table) are stored as table information. Table_id (table identification) is an area to be used for identifying a table stored in this data transmission message. In the data transmission message, three kinds of signaling tables including a data asset management table (DAMT), a data directory management table (DDMT), and a data content management table (DCMT) are transported (as described above), and table_id (table identifier) identifies a table among these. Table_version (a version of a table) indicates a version of a table stored in this data transmission message Table_length (a length of a table) indicates a size of a table stored in this data transmission message in units of bytes.

In addition, the same number of loops of the table as indicated by num_of_tables are set. In a loop of one table, information of the substance of the table identified with table_id is stored. Table (table) indicates a table stored in the data transmission message.

FIG. 25 illustrates an example of a configuration of a data asset management table 2500 transported in the data transmission message. The data asset management table is a table for managing information of assets of file data transported as MMTP packets and information of items included in each asset of the file data. Semantics of parameters of this data asset management table will be described below.

Table_id (table identification) is an 8-bit fixed value indicating a data asset management table among various kinds of signaling information, and is set to 0xA2 in the present embodiment. Version_ (a version) is an 8-bit integer parameter indicating a version of the data asset management table. When at least some parameters constituting the data asset management table are updated, for example, the version increments by 1. Length is a 16-bit-long parameter indicating a size of the data asset management table counted from immediately after this field in units of bytes.

Number_of_asset is an 8-bit parameter indicating the number of assets of file data included in a package. The same number of loops of the following asset information as indicated by number_of_asset are set to store information of the file data of each asset.

In a loop of one piece of asset information, download_id, information related to the asset itself (file data), and information related to each item included in the asset are included. Download_id is identification information written in the extended header of an MMTP packet transporting non-timed media (file data) (see FIG. 7).

As information related to the asset itself stored in the loop of the asset information, asset_ID_scheme, asset_ID_length, asset_ID_length, and asset_ID_byte are included. Asset_ID_scheme indicates a format of asset_ID. As a format of asset_ID, for example, any of universal unique identifier (UUID), uniform resource identifier (URI), and general URL (GURL) can be allocated. Asset_ID_length indicates a length of asset_ID_byte in units of bytes. Asset_ID_byte indicates asset_ID in a series of areas constituted by the same number of loops as indicated by asset_ID_length in the format designated in asset_ID_scheme. In addition, this information is used in the present embodiment as information for identifying an asset common for an MP table and a data asset management table; however, its data amount is great, and thus other substitutable asset identification information may be used. It is assumed that, for example, 16-bit component_tag is defined as information corresponding to asset_ID in an MP table, and component_tag is used in place of asset_ID in a data asset management table.

Number_of_items is an area in which the number of items constituting the assets of the file data is written. In addition, a loop of the same number of items as indicated by number_of_items is set, and information related to the items constituting the assets (file data) is written.

In the loop of one item, parameters of item_ID, node_tag, item_size, item_version, item_checksum, and item_info are described as information related to the item. Item_ID is a 32-bit value indicating the ID that identifies the item transported in a non-timed MFU. Node_tag is 16-bit-value information likewise for identifying the item. By using 16-bit node_tag instead of 32-bit item_id as signaling information, a bit size necessary for identifying the item can be reduced. Note that a node refers to each directory and item serving as a node in a structure of directories constituting a data broadcasting application (content). Not only an item but also a directory can be designated by node_tag. Item_size indicates a size of the item in units of bytes. Item_version indicates a version of the item, and version increments by 1 each time the content of the item is updated. Item_checksum indicates a checksum of the item. Note that a checksum necessarily set for all files is considered to cause an amount of information to be large. Thus, in consideration of this point, 1-bit check sum flag is set, for example, and 32-bit item check sum may be set to appear only when 1 is substituted for the flag. Alternatively, rather than signaling, checksum may be indicated as a type in the extended header of the MMTP packet illustrated in FIG. 7, and 32-bit checksum may be arranged after length. Item_info_length indicates a size of an information area of item_info_byte in units of bytes. Then, item_info_byte stores information related to the item (item_info( )) in a series of areas constituted by the same number of loops as indicated by item_info_length.

Descriptor_loop_length indicates a total byte length of descriptors. Descriptor stores information of the descriptors (descriptor( )) in a series of area constituted by the same number of loops as indicated by descriptor_loop_length. The stored descriptors are defined separately.

In short, the data asset management table 2500 is a table that manages assets of file data (content) included in one package and information related to items included in the assets. As information related to the items, version information of the items is also managed. With reference to the data asset management table 2500, download ID or item_info described in an MMT extended header transporting corresponding asset_id or an asset can be drawn from node_tag (or item_ID), or item_ID or item_info of file data on a transmission path can be drawn from node_tag handled on a transmission path of signaling information.

FIG. 26 illustrates an example of a configuration of a data directory management table (DDMT) 2600 transported in the data transmission message. The data directory management table is a table for managing directories constituting a data broadcasting application (content) and location information of nodes (lower-level directories or items (file data)) included in the directories. Semantics of parameters of this data directory management table will be described below.

In Table_id (table identification), an 8-bit fixed value indicating a data directory management table among various kinds of signaling information is written. Version_ (a version) is an 8-bit integer parameter indicating a version of the data directory management table. When at least some parameters constituting the data directory management table are updated, for example, the version increments by 1. Length is a 16-bit-long parameter indicating a size of the data directory management table counted from immediately after this field in units of bytes.

Base_folder_path_length indicates a size of an information area of base_folder_path_byte in units of bytes. Base_folder_path_byte stores the names of paths to base_folder (higher-level directories) in a series of areas constituted by the same number of loops as indicated by base_folder_path_length. Base_folder_path_byte is expressed in, for example, an absolute URL format for accessing a corresponding directory.

Num_of_folder_nodes indicates the number of folder nodes described in the data directory management table. In addition, a loop of the same number of folder nodes as indicated by num_of_folder_nodes is set.

In a loop of one folder node, information of the folder node described in the data directory management table and information of file data included in a base folder are stored.

As the information of the folder node, node_tag, and folder_node_path are stored. Node_tag indicates tag information for identifying the corresponding folder node with 16 bits. Folder_node_path_length indicates a size of an information area of folder_node_path_byte in units of bytes. Folder_node_path_byte stores the name of a path to folder_node in a series of areas constituted by the same number of loops as indicated by folder_node_path_length. Folder_node_path_byte is expressed in, for example, a relative URL format to base_folder_path for accessing a corresponding directory. Although not illustrated, folder_node_version (version information of the folder node) may be provided as information of the folder node. For example, if the name of a path (URL) to base_folder is "http://www.xbc.com" and the name of a bus (URL) to folder_node is "index.html," these character strings are joined and thereby a complete URL "http://www.xbc.com/index.html" can be obtained.

Num_of_files indicates the number of files described in the data directory management table. In addition, a loop of the same number of files as indicated by num_of_files is set.

In a loop of one file, information of each piece of file data included in the base folder is stored. As information of each piece of file data included in the base folder, node_tag, and file_name_byte (the name of the file) are stored. Node_tag indicates information for identifying an item transported in a non-timed MFU with 16 bits that is shorter than 32-bit item_ID. Note that a node refers to each directory and item serving as a node in a structure of directories constituting a data broadcasting application (content). Not only items but also directories can be designated with node_tag (as described above). File_name_byte is stored in a series of areas constituted by the same number of loops as indicated by file_name_length.

In short, the data directory management table 2600 is a table that manages a directory structure related to directories included in one package and sub directories and files (items) included in the directories. With the data directory management table 2600, a file configuration of a data broadcasting application and a configuration for file transport can be separated from each other. In addition, with reference to the data directory management table 2600, the name of a path (URL) to a corresponding item can be drawn from node_tag, or conversely, corresponding node_tag can be drawn from the name of a path (URL). Note that, in the data directory management table of the present configuration example, location information of a directory in which a file is present is set as folder_path_byte, identification information is given to each directory as node_tag, and only a file name and node_tag are designated as information of each item, and thus an amount of information of folder_path_byte will not become excessively large.

Next, a data content management table (DCMT) transported in the data transmission message will be described.

The data content management table (DCMT) is a table for managing information of file data transported as non-timed media, i.e., content (data broadcasting application). In the present embodiment, information for designating compulsory cache is included in the data content management table and transported. Data broadcasting interoperating with a broadcast program is required to be presented in a timely manner. In such a case, the broadcasting sending system 11 side includes information for designating compulsory cache in the data content management table (DCMT), and the receiver 12 side pre-caches each file to be used in data broadcasting interoperating with the broadcast program, and thus timely presentation of the data broadcasting can be realized.

As transport methods for the compulsory cache using the data content management table (DCMT), the following two methods can be exemplified.

(Method 1) In the data content management table, information of a list of broadcasting transport files (member items) and a central file (a primary item) constituting a presentation unit, and pre-cache target files (pre-cached items) when there are target files to be pre-cached is described for each data broadcasting presentation unit (PU).

The pre-cache target files mentioned here are constituted by, for example, a list of broadcasting files constituting a data broadcasting presentation unit (PU) to be referred to next after a current data broadcasting presentation (PU). As a production side of the broadcast program presents the list of pre-cache target files with signaling information of data broadcasting in that manner, a receiver side can perform a cache control operation using pre-caching in which file data necessary for a data broadcasting presentation unit to be transitioned to next is pre-cached. As a result, a timely data broadcasting service interoperating with the broadcast program can be realized.

(Method 2) In the data content management table, information of a list of broadcasting transport files (member items) and a central file (a primary item) constituting a presentation unit, a target file to be locked in a cache (a lock cache item) and a target file to be unlocked (an unlock cache item) among lock targets is described for each data broadcasting presentation unit (PU).

A lock target file mentioned here is constituted by, for example, a list of broadcasting files to be used in a data broadcasting presentation unit (PU) to be referred to next from a current data broadcasting presentation unit (PU). A production side of the broadcast program presents a list of lock and unlock target files using signaling information of the data broadcasting in this manner, and thus a receiver side can perform a cache control operation using locking and unlocking. For example, the receiver side can lock file data necessary for a data broadcasting presentation unit to be transitioned to next in a cache. As a result, a timely data broadcasting service interoperating with the broadcast program can be realized. In addition, an unlock target file is constituted by, for example, a list of broadcasting files unnecessary in the current data broadcasting presentation unit (PU). By designating an unlock target file, unnecessary files can be deleted from the cache memory 408, and a size of the memory can be saved.

FIG. 27 illustrates an example of a configuration of a data content management table (DCMT) 2700 transported in the data transmission message realizing Method 1.

In Table_id (table identification), an 8-bit fixed value indicating a data content management table among various kinds of signaling information is written. Version_ (a version) is an 8-bit integer parameter indicating a version of the data content management table. When at least some parameters constituting the data content management table are updated, for example, the version increments by 1. Length is a 16-bit-long parameter indicating a size of the data content management table counted from immediately after this field in units of bytes.

Number_of_content is an 8-bit parameter indicating the number of pieces of content included in a package (content is, for example, file data such as an HTML document describing a data broadcasting application). The same number of loops of the following content as indicated by number_of_content are set, and information of each piece of content is stored.

In a loop of one piece of content, content_ID, content_version, content_cache_size, and information related to a data broadcasting presentation unit (Presentation Unit: PU) included in the content is written as information related to the content. Content_ID is identification information of the content. Content_version indicates a version of the content. Content_cache_size indicates a size of content to be cached.

Number_of_PU is the number of data broadcasting presentation units PU included in the content, and a loop of the same number of PUs as number_of_PU is set.

In a loop of one PU, PU_tag that is identification information of the PU, PU_cache_size indicating a size of the PU to be cached, PU_primary_item_node_tage for identifying a central file (primary item) of the data broadcasting presentation unit (PU) are written.

In addition, in the loop of the PU, a list of broadcasting transport files (member items) constituting the data broadcasting presentation unit (PU) is written Specifically, number_of_PU_member_nodes indicates the number of nodes included in the data broadcasting presentation unit (PU) (i.e., serving as members of the PU). Thereafter, a loop of the same number of PU member nodes as number_of_PU_member_nodes is set, and in a loop of each PU member node, node_tag of the PU member node is written. The PU member node includes a directory node and an item node.

In addition, in the loop of the PU, when there are pre-cache target files in the PU, information of a list of the target files (pre-cached items) is described. Specifically, number_of_pre_cache_nodes is the number of nodes to be pre-cached, and a loop of the same number of pre-cache nodes as number_of_pre_cache_nodes is set. In a loop of one pre-cache node, pre_cache_node_tag for identifying the pre-cache node is written.

The pre-cache target files mentioned here are constituted by, for example, a list of broadcasting files constituting a data broadcasting presentation unit (PU) to be referred to next after a current data broadcasting presentation (PU). As a production side of the broadcast program presents the list of pre-cache target files with signaling information of data broadcasting in that manner, a receiver side can pre-cache file data necessary for a data broadcasting presentation unit to be transitioned to next. As a result, a timely data broadcasting service interoperating with the broadcast program can be realized.

In addition, in a loop of one PU, number_of_linked_PU indicating the number of other PUs linked to this PU, and a loop of the same number of linked_PU as number_of_linked_PU is set. In the loop of one linked_PU, linked_PU_tag that is identification information of linked_PU is written.

FIG. 28 illustrates an example of a configuration of a data content management table (DCMT) 2800 transported in the data transmission message realizing Method 2.

In Table_id (table identification), an 8-bit fixed value indicating a data content management table among various kinds of signaling information is written. Version_ (a version) is an 8-bit integer parameter indicating a version of the data content management table. When at least some parameters constituting the data content management table are updated, for example, the version increments by 1. Length is a 16-bit-long parameter indicating a size of the data content management table counted from immediately after this field in units of bytes.

Number_of_content is an 8-bit parameter indicating the number of pieces of content included in a package (content is, for example, file data such as an HTML document describing a data broadcasting application). The same number of loops of the following content as indicated by number_of_content are set, and information of each piece of content is stored.

In a loop of one piece of content, content_ID, content_version, content_cache_size, and information related to a data broadcasting presentation unit (Presentation Unit: PU) included in the content is written as information related to the content. Content_ID is identification information of the content. Content_version indicates a version of the content. Content_cache_size indicates a size of content to be cached.

Number_of_PU is the number of data broadcasting presentation units PU included in the content, and a loop of the same number of PUs as number_of_PU is set.

In a loop of one PU, PU_tag that is identification information of the PU, PU_cache_size indicating a size of the PU to be cached, PU_primary_item_node_tage for identifying a central file (primary item) of the data broadcasting presentation unit (PU) are written.

In addition, in the loop of the PU, a list of broadcasting transport files (member items) constituting the data broadcasting presentation unit (PU) is written. Specifically, number_of_PU_member_nodes indicates the number of nodes included in the data broadcasting presentation unit (PU) (i e, serving as members of the PU) Thereafter, a loop of the same number of PU member nodes as number_of_PU_member_nodes is set, and in a loop of each PU member node, node_tag of the PU member node is written. The PU member node includes a directory node and an item node.

In addition, in the loop of the PU, information of a file of which caching in the cache memory 408 is locked (a lock cache item) and a file to be unlocked (an unlock cache item) among lock targets is described for the PU. Specifically, number_of_lock_cache_nodes is the number of nodes serving as lock targets, and thereafter a loop of the same number of lock target nodes as number_of_lock_cache_nodes is set. In the loop of one lock target node, lock_cache_node_tag for identifying a lock target node is written. In addition, number_of_unlock_cache_nodes is the number of nodes serving as unlock targets, and thereafter a loop of the same number of unlock target nodes as number_of_unlock_cache_nodes is set. In the loop of one unlock target node, unlock_cache_node_tag for identifying an unlock target node is written.

A lock target file mentioned here is constituted by, for example, a list of broadcasting files to be used in a data broadcasting presentation unit (PU) to be referred to next from a current data broadcasting presentation unit (PU). A production side of the broadcast program presents a list of lock target files using signaling information of the data broadcasting in this manner, and thus a receiver side can lock file data necessary for a data broadcasting presentation unit to be transitioned to next in a cache. As a result, a timely data broadcasting service interoperating with the broadcast program can be realized. In addition, an unlock target file is constituted by, for example, a list of broadcasting files unnecessary in the current data broadcasting presentation unit (PU) By designating an unlock target file, unnecessary files can be deleted from the cache memory 408, and a size of the memory can be saved.

In addition, in a loop of one PU, number_of_linked_PU indicating the number of other PUs linked to this PU, and a loop of the same number of linked_PU as number_of_linked_PU is set. In the loop of one linked_PU, linked_PU_tag that is identification information of linked_PU is written.

In short, the data content management table is a table that manages each piece of content (data broadcasting applications) in one package in data broadcasting presentation units (PUs), and with reference to the data content management table, PU_tag of a data broadcasting presentation unit including a node can be acquired from node_tag. In addition, an aspect in which the receiver 12 side of the data content management table controls compulsory cache of data broadcasting files is provided. However, details of the cache control operation using the data content management table are reserved for later description.

Figure 29:
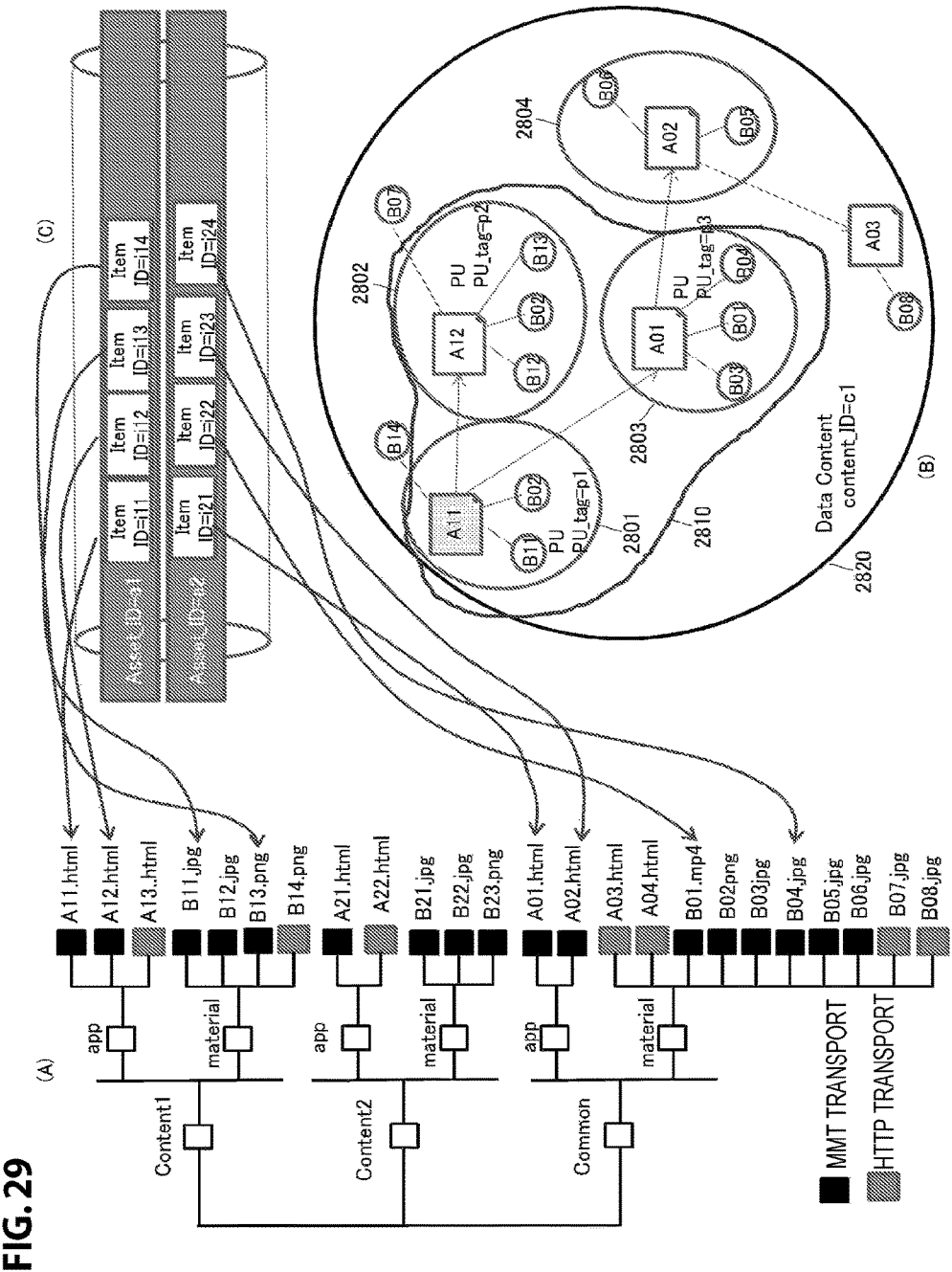
FIG. 29 is a diagram for describing a mechanism for performing transport, location, and presentation of an MMT-transported data broadcasting application (content).

FIG. 29 illustrates a mechanism for a transport of MMT-transported data broadcasting applications (content), location of content, and presentation of the applications.

FIG. 29(A) illustrates a structure of directories of content. Each piece of content content1, 2, . . . is constituted by a data broadcasting application (app) and a material. The data broadcasting application and the material are resources of which substances are file data. Each resource corresponds to an item that is a constituent element of an asset on an MMT transmission path, and can be identified with 32-bit item_ID. In addition, in signaling information, an item can be identified with 16-bit node_tag. As illustrated in FIG. 29(C), each resource is transported as an item on an MMT transmission path of a corresponding asset (to be described below). An application includes one or more HTML documents referred to during execution of content (during presentation of data broadcasting). In addition, a material is monomedia data such as a jpeg image or text referred to from an HTML document. One data broadcasting presentation unit PU is constituted by one HTML document and a material referred to therefrom. In the example illustrated in FIG. 29(A), content1 has one or more HTML documents such as A11.html, A12.html, and A13.html as resources of the data broadcasting application. Among these, A11.html is a resource directly referred to during execution of the content.

FIG. 29(B) illustrates reference relations between resources during execution of the content (during presentation of the data broadcasting). In the illustrated example, an application A11 that is directly referred to during the execution of the content and materials B11 and B02 referred to by the application form a resource group 2801 constituting one data broadcasting presentation unit PU, and p1 is allocated thereto as PU_tag. (Note that B14 is a material that can be acquired through an HTTP transport in communication when necessary, rather than an MMT transport in broadcasting. B14 is treated as not being included in the resource group of the application presentation unit p1.)

Likewise, the application A12 and materials B12, B02, and B13 form a resource group 2802 constituting one data broadcasting presentation unit PU, and p2 is allocated thereto as PU_tag. (Note that B07 is a material that can be acquired through an HTTP transport in communication when necessary, rather than an MMT transport in broadcasting. Hereinbelow, B07 is treated as not being included in the resource group p2 of the data broadcasting presentation unit.) Likewise, an application A01 and materials B03, B01, and B04 referred to by the application form a resource group 2803 constituting one data broadcasting presentation unit PU, and p3 is allocated thereto as PU_tag.

In addition, a plurality of HTML documents can have a link reference relation (as is known). In the example illustrated in FIG. 29(B), the resource A11.html is an HTML document describing an application presentation screen displayed first and directly referred to during the execution of the content. Meanwhile, a resource A12.html included in the same content1 and a resource A01.html included in common other than content 1 are HTML documents describing an application presentation screen transitioning from a screen on which A11.html is executed and presented, having a link reference relation with A11.html. The resources A11.html, A12.html, and A01.html respectively form resource groups 2801, 2802, and 2803 each constituting one data broadcasting presentation unit PU. In addition, an upper-level larger resource group 2810 is formed with the interlinked data broadcasting presentation units 2801, 2802, and 2803. The resources A11.html, A12.html, and A01.html are each main file data (primary item_node) in their data broadcasting presentation units PUs.

In addition, a large resource group, i.e., whole data content, is constituted by whole data of all applications included in a package (one broadcast program). The whole data content is a range of data broadcasting presentation units PUs having common content_ID. In a data content management table, by iterating a loop of PUs with corresponding content_ID, all data broadcasting presentation units PUs included in content can be collectively specified. In the example illustrated in FIG. 29(B), a resource group 2820 of the whole content included in the package (one broadcast program) is formed with the applications included in content1 and common.

FIG. 29(C) schematically illustrates a state in which content is MMT-transported. Applications and materials that are constituent elements of the content have file data as their substance, and are called "resources." Each of the resources corresponds to items that are constituent elements of an asset on an MMT transmission path. In an MMT transport, each piece of content included in a package is treated as one asset, and asset_ID is allocated thereto. In the illustrated example, a1 is allocated to content1 asset_ID. In addition, in an MMT transport, each of resources such as HTML document data or a material is treated as one item, and item_ID is allocated thereto. In the illustrated example, i11, i12, i13, and i14 are allocated to each of the resources included in content1 as item_ID.

In addition, resources included in the same content share the same asset_ID, and are transported on the same MMT transmission path. In the example illustrated in FIG. 29(C), the items with item_IDs i11, i12, i13, and i14 share a1 as the same asset_ID, and are transported on the same MMT transmission path. The above-described data directory management table is expressed in FIG. 29(A), the data content management table is expressed in FIG. 29(B), and the data asset management table is expressed in FIG. 29(C), and the tables are associated with each other by item_ID or node_tag.

Figure 30:
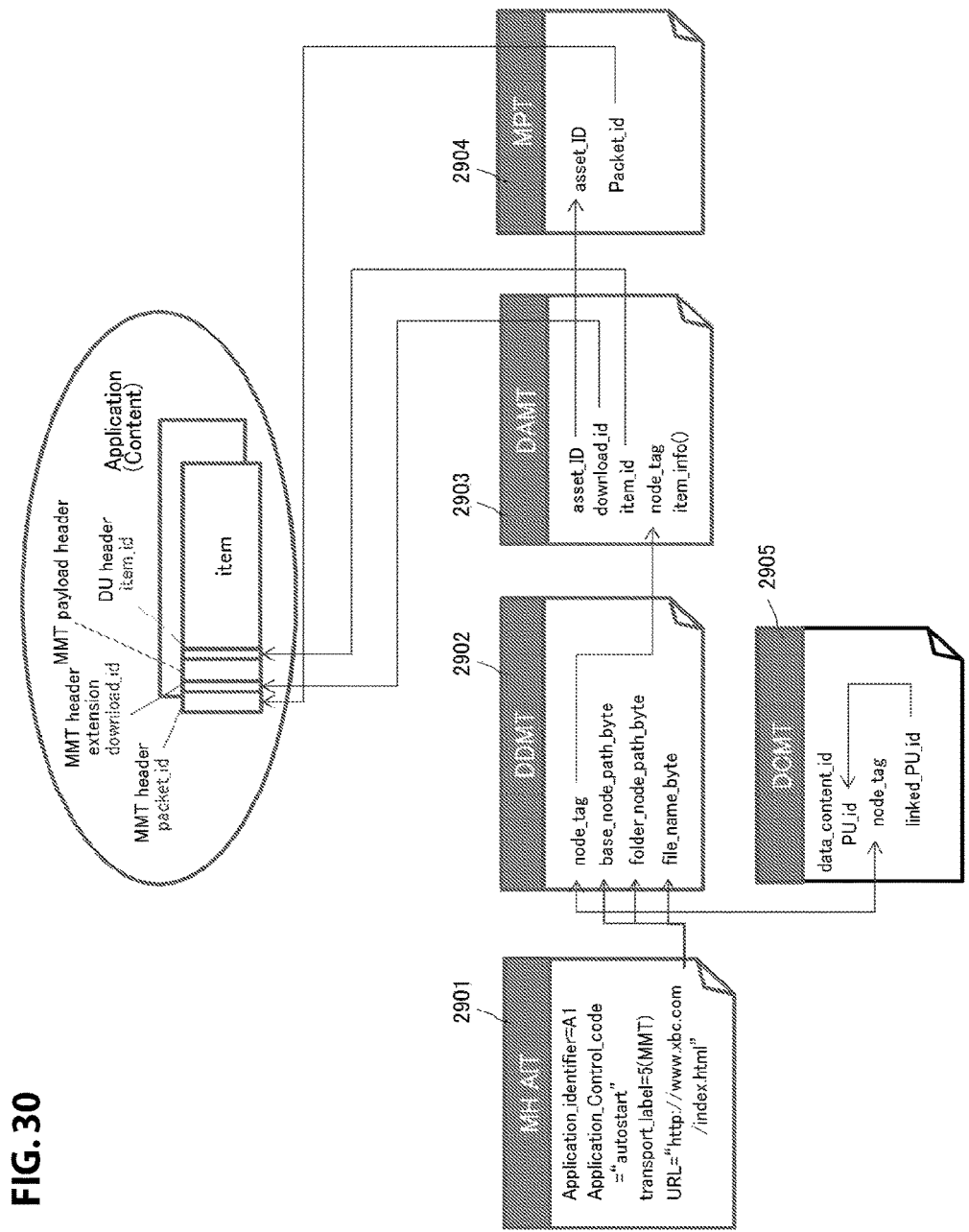
FIG. 30 is a diagram for describing a reference relation of tables transported as signaling information when data broadcasting applications (content) are acquired from an MMT transmission path.

A reference relation of tables transported as signaling information when data broadcasting applications (content) are acquired from an MMT transmission path will be described with reference to FIG. 30.

Upon acquiring an MH-AI table (MH AIT) 2901 in an M2 section message, the receiver 12 refers to application_control_code to check how a state of an application is controlled. Then, when "autostart" is instructed, the receiver refers to transport_protocol_label of the table, and if it is ascertained that an MMT transport has been designated, URL information of an item (file data) directly referred to during presentation of this application is extracted from a transport protocol descriptor. Then, the receiver refers to a data directory management table (DDMT) 2902 sent in a data transmission message, and thereby can acquire node_tag of an item corresponding to a combination of base_folder_path_byte, folder_node_path_byte, and file_name_byte of the table.

Next, with reference to a data asset management table (DMAT) 2903 sent in the data transmission message, the receiver 12 returns the acquired node_tag to item_ID on an MMT transmission path, and specifies a corresponding asset and acquire asset_ID and download_id thereof.

Then, upon acquiring packet_id corresponding to the acquired asset_ID with reference to an MT table (MPT) 2904 sent in a PA message, the receiver performs filtering based on packet_id in a header of the MMTP packet, download_id in an extended header, and item_ID in a DU header on an MMT transmission path of file data, and can acquire a desired item (that is directly referred to during presentation of the application).

In addition, the receiver 12 draws node_tag acquired from the data directory management table 2902 from a data content management table (DCMT) 2905 sent in the data transmission message, and thus can extract PU_tag of a presentation unit of the application. In addition, by iterating a loop of linked_PU in a loop of a PU of this PU_tag, PU_tag of a presentation unit of another application linked thereto can be collectively extracted.

Figure 31:
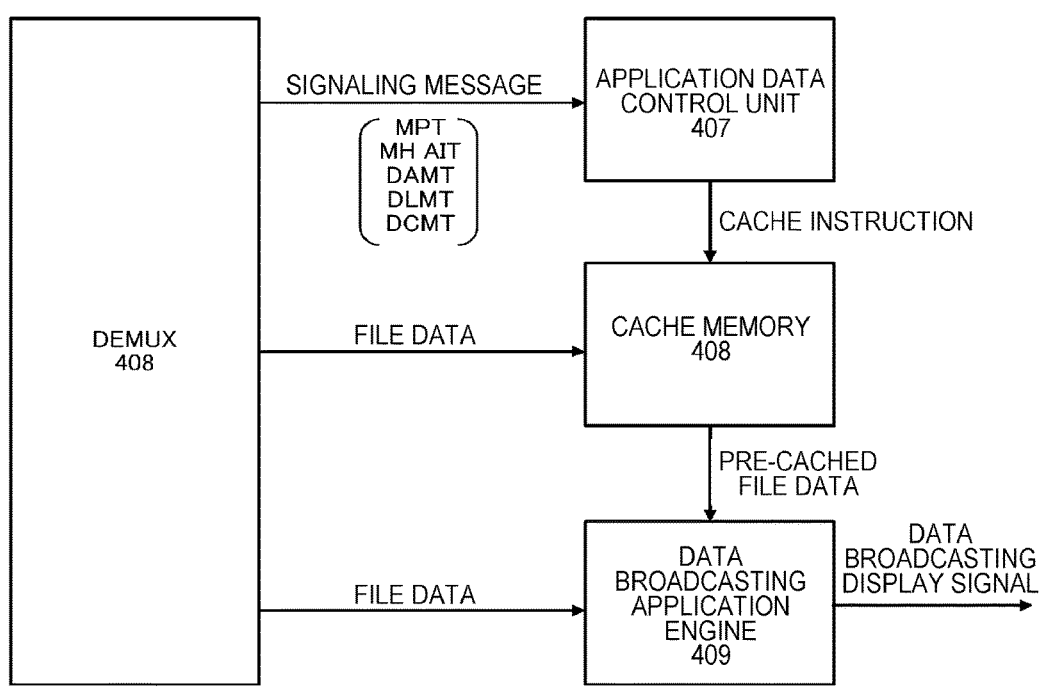
FIG. 31 is a diagram schematically illustrating a mechanism that controls caching of data broadcasting applications (content) in a receiver.

FIG. 31 schematically illustrates a mechanism that controls caching of file data to be used in data broadcasting in a receiver. Control of caching referred to here includes pre-caching file data to be executed, locking file data to be referred to next in a cache, and unlocking a cache of unnecessary file data.

The application data control unit 407 analyzes a signaling message demultiplexed from a broadcast stream by the demultiplexer 402, and controls an operation performed inside the receiver. With regard to pre-caching of content, the application data control unit 407 pre-caches each file to be used in data broadcasting interoperating with a broadcast program based on compulsory cache information included in the data content management table. Alternatively, caching of a file designated as a lock target in the data content management table is locked, and locking of caching of a file designated as an unlock target is released.

Specifically, the application data control unit 407 acquires cache_node_tag of a node (a directory or file data) designated to be pre-cached in the data content management table transported in the data transmission message. Specification of a corresponding MMTP packet from node_tag is as described with reference to FIG. 30.

The application data control unit 407 draws node_tag of file data that is desired to be pre-cached from the data asset management table transported into the data transmission message, then acquires asset_ID of an asset to which the node belongs, and next draws asset_ID from the MP table transported in the PA message, then acquires packet_id of the MMTP packet in which the asset is transported. In addition, upon acquiring download_id described in the extended header of the MMTP packet transporting a desired item from the data asset management table, the system control unit 408 performs filtering based on packet_id in the header of the MMTP packet, download_id in the extended header, and item_ID in the DU header on the MMT transmission path of the file data, then acquires an entity of a desired item, and then pre-caches the item in the cache memory 408.

If a necessary item (file data) has already been cached in the cache memory 408 when an application is executed, the data broadcasting application engine 409 extracts the file data from the cache memory 408 without waiting for arrival of file data demultiplexed by the demultiplexer 402 from a broadcast stream, gives a quick response, and thus can generate a data broadcasting display signal. On the other hand, when there is no necessary item in the cache memory 408, the data broadcasting application engine 407 waits for arrival of file data demultiplexed from a broadcast stream, gives a response, and then generates a data broadcasting display signal.

Next, a control operation of the receiver 12 to cache file data to be used in data broadcasting will be described in detail.

The fact that there are two methods of Method 1 and Method 2 as transport methods of compulsory cache information based on a data content management table (DCMT) has already been described. First, a cache control operation using Method 1 will be described.

In Method 1, the data content management table (DCMT) 2700 illustrated in FIG. 27 is transported in a data transmission message from the broadcasting sending system 11 side. The data content management table (DCMT) 2700 describes information of a list of broadcasting transport files (member items) and a central file (a primary item) constituting a presentation unit, and a list of target files (pre-cached items) when there are pre-cache target files for each presentation unit (PU) of data broadcasting. Thus, the receiver 12 side can perform a cache control operation through pre-caching as shown below.

(Operation 01) The application data control unit 407 acquires latest information while appropriately detecting and updating a data transmission message transported on the MMT transmission path 504. (Operation 02) The application data control unit 407 recognizes a presentation state of a corresponding data broadcasting presentation unit (PU) as the unit accesses an application file designated as being primary_item (which serves as the center of data broadcasting presentation units) through an instruction from the data broadcasting application control engine 409. (Operation 03) The application data control unit 407 also simultaneously acquires each of member files (PU_member_node) included in a corresponding data broadcasting presentation unit (PU) in a data content management table (DCMT) included in the data transmission message, and stores the files in the cache memory 408. (Operation 04) Furthermore, when a pre-cache target is designated for a corresponding data broadcasting presentation unit (PU) in the data content management table, the application data control unit 407 also acquires each pre-cache target file (item) and pre-caches it in the cache memory 408. (Operation 05) The data broadcasting application engine 409 executes an application file designated as primary_item from the cache memory 408. (Operation 06) Thereafter, when there is a change in the member files (PU_member_node) included in a data broadcasting presentation unit (PU) currently in a presentation state or a configuration of the pre-cache target file through updating of the data content management table (DCMT), or when a state transitions to a presentation state of another data broadcasting presentation unit (PU) through an application operation of the data broadcasting application engine 409, the above-described processes (Operation 03) to (Operation 05) are performed in the data broadcasting presentation units (PU) currently in a presentation state. Even though a file is stored in the cache memory 408 in a previous state, the application data control unit 407 deletes an unnecessary file from the cache memory 408 in the current state.

Figure 32:
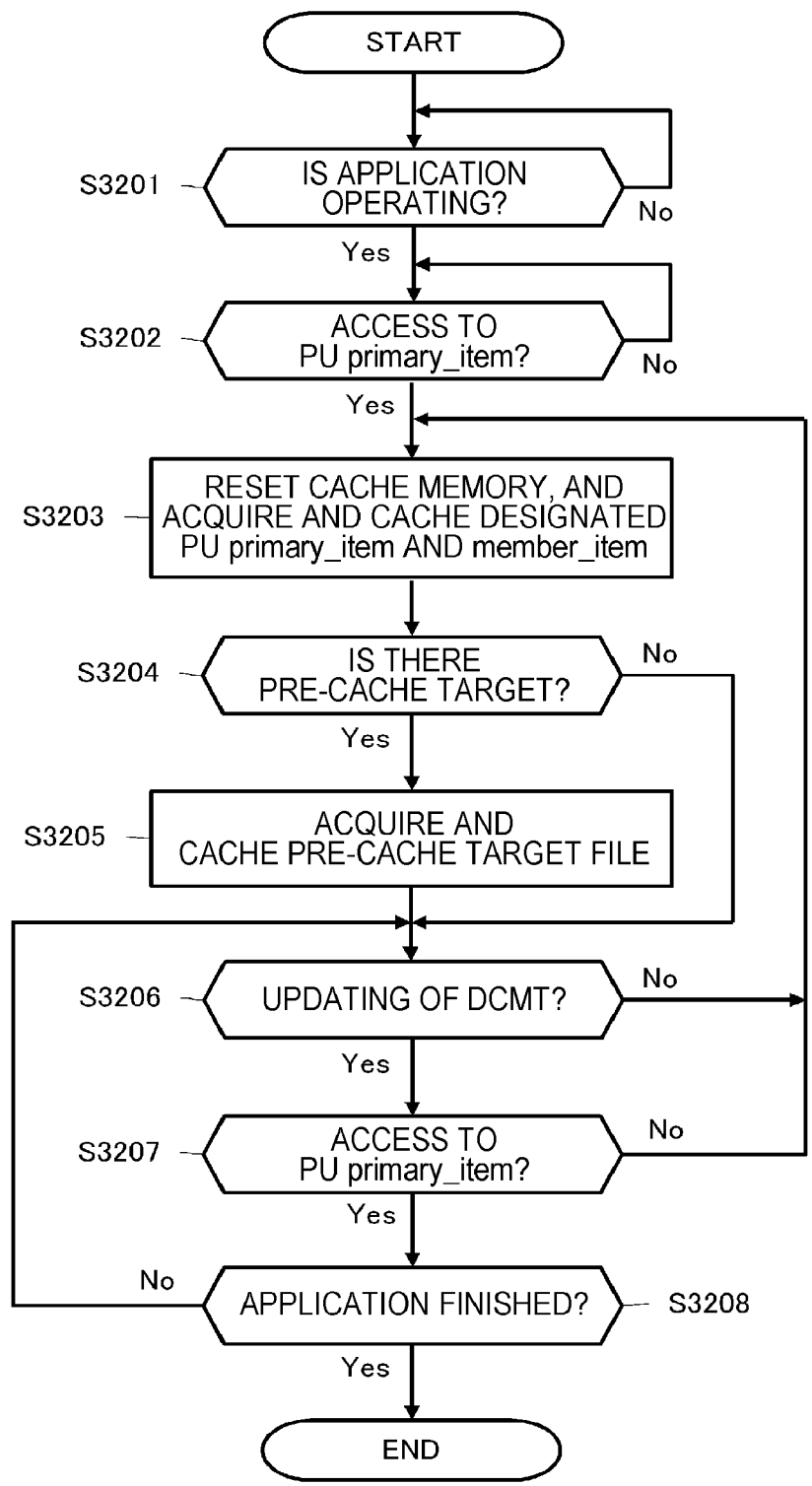
FIG. 32 is a flowchart illustrating a procedure of cache control of file data by a receiver 12 based on Method 1.

FIG. 32 illustrates a procedure of cache control of file data by the receiver 12 based on Method 1 in the form of a flowchart.

When the data broadcasting application control engine 409 performs an application operation, i.e., presentation of data broadcasting (Yes in Step 3201), the application data control unit 407 accesses an application file designated as primary_item (serving as the center of data broadcasting presentation units) in a data content management table (Yes in Step S3202), and thus recognizes a presentation state of a corresponding data broadcasting presentation unit (PU).

The application data control unit 407 resets the cache memory 408 and acquires primary_item of the data broadcasting presentation unit (PU) currently presented and each member file (PU_member_node) in a data content management table (DCMT), and then stores the data in the cache memory 408 (Step S3203). The data broadcasting application engine 409 executes the application file designated as primary_item from the cache memory 408.

In addition, the application data control unit 407 checks whether a pre-cache target has been designated with respect to a corresponding data broadcasting presentation unit (PU) in the data content management table (Step S3204). Then, when a pre-cache target has been designated (Yes in Step S3204), the application data control unit 407 also acquires each pre-cache target file (item) and pre-caches it in the cache memory 408 (Step S3205).

Thereafter, when there is a change in the member files (PU_member_node) included in a data broadcasting presentation unit (PU) currently in a presentation state or a configuration of the pre-cache target file through updating of the data content management table (DCMT) (Yes in Step S3206), the process returns to Step S3203, and the above-described processes are repetitively performed in the data broadcasting presentation units (PU) currently in a presentation state.

In addition, when a state transitions to a presentation state of another data broadcasting presentation unit (PU) through an application operation of the data broadcasting application engine 409 and thus the engine accesses an application file designated as primary_item of the data broadcasting presentation unit (Yes in Step S3207), the process returns to Step S3203, and the above-described processes are repeated in the data broadcasting presentation unit (PU) to which the transition has been completed.

The above-described processes are repeated until the data broadcasting application engine 409 finishes the application operation (No in Step S3208).

Figure 33:
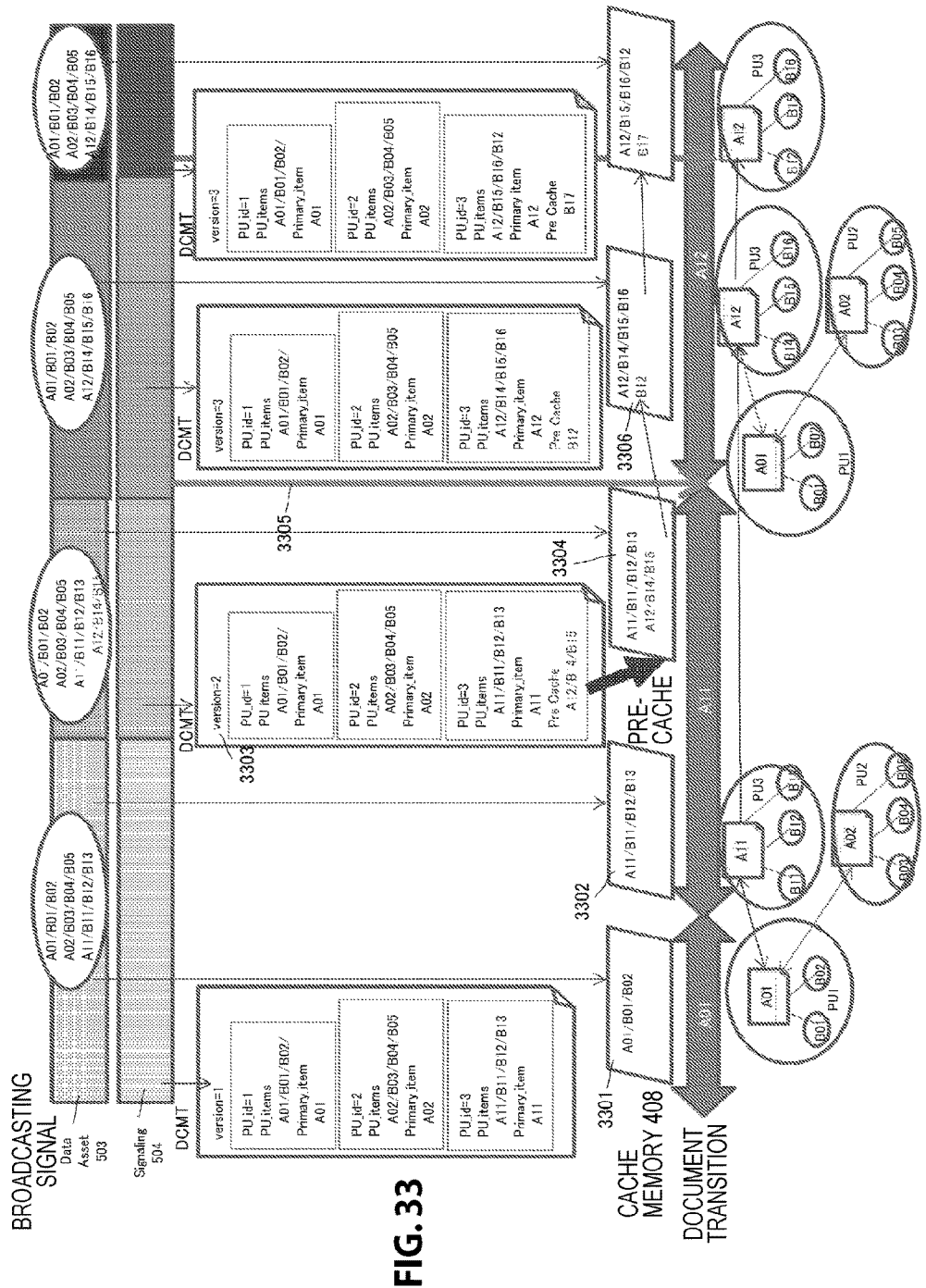
FIG. 33 is a diagram illustrating an example of a pre-cache operation of file data by the receiver 12 based on Method 1.

FIG. 33 illustrates an example of a pre-cache operation of file data by the receiver 12 based on Method 1.

The application data control unit 407 interprets various signaling messages received on the MMT transmission path 504. A data transmission message that is one of the signaling messages includes a data content management table (DCMT).

While the data broadcasting application control engine 409 is performing an application operation of a data broadcasting presentation unit (PU) identified with PU_id=1, if the application data control unit 407 refers to the data content management table and thus acquires node_tag of each of an application file "A01.html" designated as primary_item (the center of data broadcasting presentation units) of the data broadcasting presentation unit (PU_id=1) that is currently in a presentation state and respective member files (PU_member_node) "B01" and "B02" from the data content management table and acquires entities of file data corresponding to the node_tag from the MMT transmission path 503 transporting data assets, the files are cached in the cache memory 408 as indicated by reference numeral 3301. Note that a method for accessing a file transported on the MMT transmission path 503 from node_tag is as described above with reference to FIG. 30 (the same applies hereinbelow). However, since no pre-cache targets are designated for this data broadcasting presentation unit (PU), no pre-cache operation is performed.

Next, it is assumed that a state transitions to a presentation state of another data broadcasting presentation unit (PU) identified with PU_id=3 through an application operation of the data broadcasting application engine 409. If the application data control unit 407 acquires node_tag of each of an application file "A11.html" designated as primary_item (the center of data broadcasting presentation units) of the data broadcasting presentation unit (PU_id=3) to which transition has been completed and respective member files (PU_member_node) "B11," "B12," and "B13" from the data content management table as described above, the application data control unit acquires entities of file data corresponding to the node_tag from the MMT transmission path 503 and caches them in the cache memory 408 as indicated by reference numeral 3302. However, since no pre-cache target has been designated for this data broadcasting presentation unit (PU), no pre-cache operation is performed.

The application data control unit 407 interprets various signaling messages received on the MMT transmission path 504 at all times. In addition, as indicated by reference numeral 3303, if the version of the data content management table is detected to have been updated from 1 to 2, the application data control unit 407 checks whether or not there is a change in primary_item of the data broadcasting presentation unit (PU_id=3) that is currently in a presentation state, each of the member files, and a pre-cache target file. Since there is no change in the member files this time, respective member files that were previously cached remain stored in the cache memory 408. In addition, since "A12," "B14," and "B15" are added as pre-cache target files of the data broadcasting presentation unit (PU_id=3), the application data control unit 407 acquires entities of file data corresponding to their node_tags from the MMT transmission path 503 and caches them in the cache memory 408 as indicated by reference numeral 3304.

Next, as indicated by reference numeral 3305, if an event message instructing updating of presentation of data broadcasting is received from the MMT transmission path 504, the data broadcasting application engine 409 performs transition of an HTML document from an A11 file being executed to an A12 file. On the other hand, substantially at the same time, the application data control unit 407 refers to the data content management table of which the version has been updated from 2 to 3, and thereby detects that primary_item of the data broadcasting presentation unit (PU_id=3) that is currently in a presentation state has changed to "A12.html" and member files have changed to "B14," "B15," and "B16." Since primary_item "A12.html" and the member files "B14" and "B15" have already been pre-cached in the cache memory 408 as described above, the data broadcasting application engine 409 can quickly display data broadcasting using the files stored in the cache memory 408. In other words, timely data broadcasting interoperating with a broadcast program can be presented. In addition, since "B12" is added as a pre-cache target file of the data broadcasting presentation unit (PU_id=3), the application data control unit 407 acquires an entity of file data corresponding to its node_tag from the MMT transmission path 503 and caches it in the cache memory 408 as indicated by reference numeral 3306.

Next, a cache control operation using Method 2 will be described.

In Method 2, the data content management table (DCMT) 2800 illustrated in FIG. 28 is transported in a data transmission message from the broadcasting sending system 11 side. The data content management table (DCMT) 2800 describes information of a list of broadcasting transport files (member items), and a central file (a primary item) constituting a presentation unit, and target files to be locked in the cache (lock cache items), and a target file to be unlocked (an unlock cache item) among lock targets for each data broadcasting presentation unit (PU). Thus, the receiver 12 side can perform a cache control operation through lock and unlock of caching as will be shown below.

(Operation 11) While appropriately detecting and updating the data transmission message transported on the MMT transmission path 504, the application data control unit 407 acquires latest information. (Operation 12) When the application data control unit 407 accesses an application file designated as primary_item (serving as the center of data broadcasting presentation units) through an instruction from the data broadcasting application control engine 409 or the like, the application data control unit recognizes a presentation state of a corresponding data broadcasting presentation unit (PU). (Operation 13) The application data control unit 407 also simultaneously acquires each of member files (PU_member_node) included in the corresponding data broadcasting presentation unit (PU) in the data content management table (DCMT) included in the data transmission message, and stores the files in the cache memory 408. (Operation 14) Furthermore, when lock cache targets are designated with respect to the data broadcasting presentation unit (PU) in the data content management table, the application data control unit 407 also acquires un-acquired files (items) among the lock cache targets, caches them in the cache memory 408, and separately manages them as lock cache target files. (Operation 15) Conversely, when unlock cache targets are designated with respect to the data broadcasting presentation unit (PU) in the data content management table, if an unlock target file is cached in the cache memory 408, the application data control unit 407 deletes this file and also deletes it from the lock cache target files that are separately managed (Operation 16) The data broadcasting application engine 409 executes the application file designated as primary_item from the cache memory 408. (Operation 17) Thereafter, when there is a change in the configuration of member files (PU_member_node) included in the data broadcasting presentation unit (PU) that is currently in a presentation state or a pre-cache target file due to updating of the data content management table (DCMT), the above-described processes of (Operation 13) to (Operation 16) are performed. (Operation 18) When a state transitions to a presentation state of another data broadcasting presentation unit (PU) through an application operation of the data broadcasting application engine 409, a lock cache target file is first stored in the cache memory 408, and then the above-described processes of (Operation 13) to (Operation 16) are performed. A file other than the lock cache target may be deleted from the cache memory 408.

Figure 34:
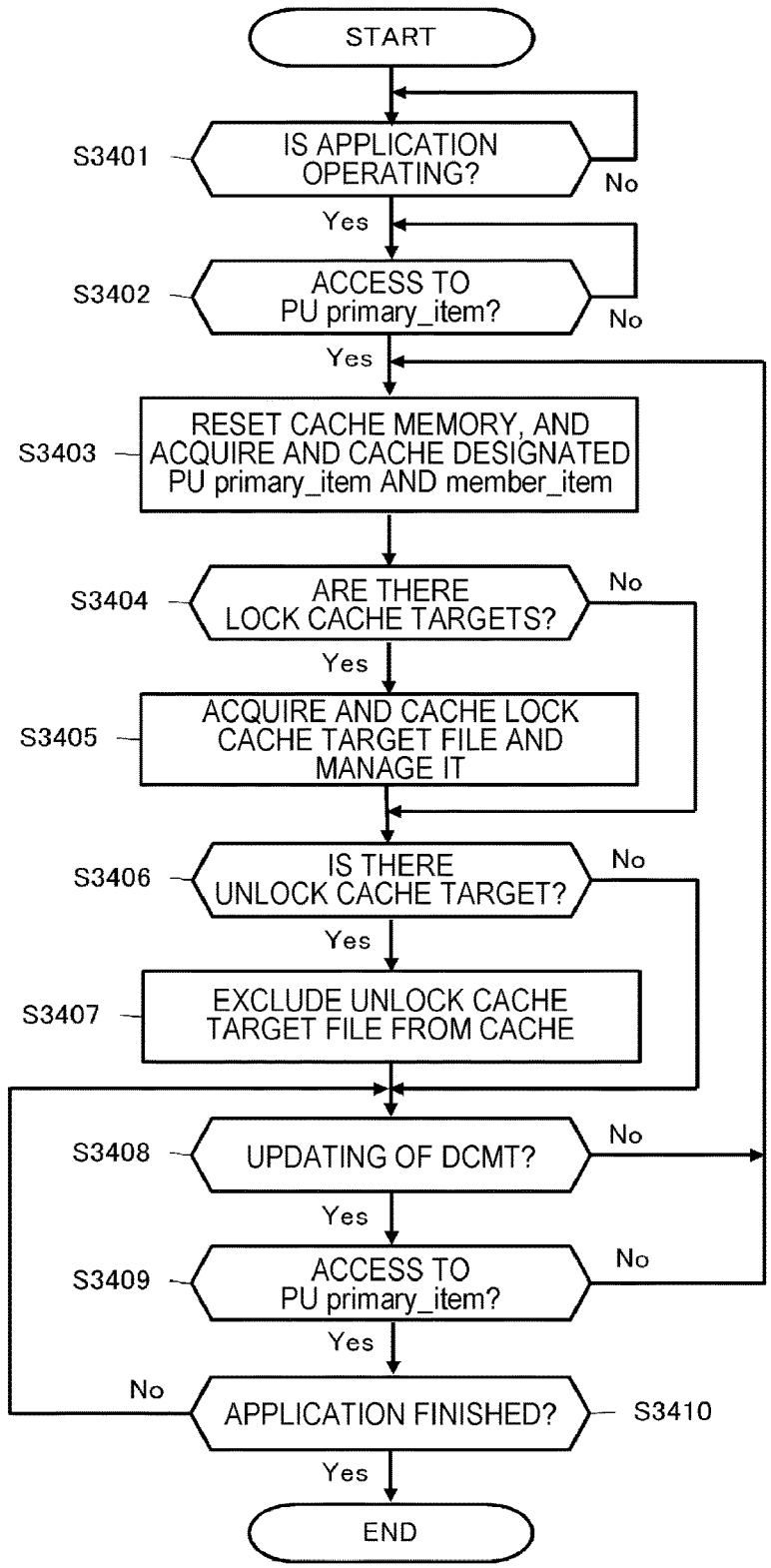
FIG. 34 is a flowchart illustrating a procedure of cache control of file data by the receiver 12 based on Method 2.

FIG. 34 illustrates a procedure of cache control of file data by the receiver 12 based on Method 2 in the form of a flowchart.

When the data broadcasting application control engine 409 performs an application operation, i.e., presentation of data broadcasting (Yes in Step 3401), the application data control unit 407 accesses an application file designated as primary_item (serving as the center of data broadcasting presentation units) in a data content management table (Yes in Step S3402), and thus recognizes a presentation state of a corresponding data broadcasting presentation unit (PU).

The application data control unit 407 resets the cache memory 408 and acquires primary_item of the data broadcasting presentation unit (PU) currently presented and each member file (PU_member_node) in a data content management table (DCMT), and then stores the data in the cache memory 408 (Step S3403) The data broadcasting application engine 409 executes the application file designated as primary_item from the cache memory 408.

In addition, the application data control unit 407 checks whether or not lock cache targets have been designated with respect to the data broadcasting presentation unit (PU) in the data content management table (Step S3404). Then, if lock cache targets have been designated (Yes in Step S3404), the application data control unit 407 also acquires each un-acquired file (item) among the lock cache targets, caches it in the cache memory 408 and separately manages it as a lock cache target file (Step S3405).

In addition, the application data control unit 407 checks whether or not an unlock cache target has been designated with respect to the data broadcasting presentation unit (PU) in the data content management table (Step S3406). Then, when an unlock cache target has been designated (Yes in Step S3406), if the unlock target file has been cached in the cache memory 408, the application data control unit 407 deletes this file, and deletes it from the separately managed lock cache target file (Step S3407).

Thereafter, when there is a change in the member files (PU_member_node) included in a data broadcasting presentation unit (PU) currently in a presentation state or a configuration of the pre-cache target file through updating of the data content management table (DCMT) (Yes in Step S3408), the process returns to Step S3403, and the above-described processes are repetitively performed in the data broadcasting presentation units (PU) currently in a presentation state.

In addition, when a state transitions to a presentation state of another data broadcasting presentation unit (PU) through an application operation of the data broadcasting application engine 409 and thus the engine accesses an application file designated as primary_item of the data broadcasting presentation unit (Yes in Step S3409), the process returns to Step S3403, and the above-described processes are repeated in the data broadcasting presentation unit (PU) to which the transition has been completed.

The above-described processes are repeated until the data broadcasting application engine 409 finishes the application operation (No in Step S3410).

Figure 35:
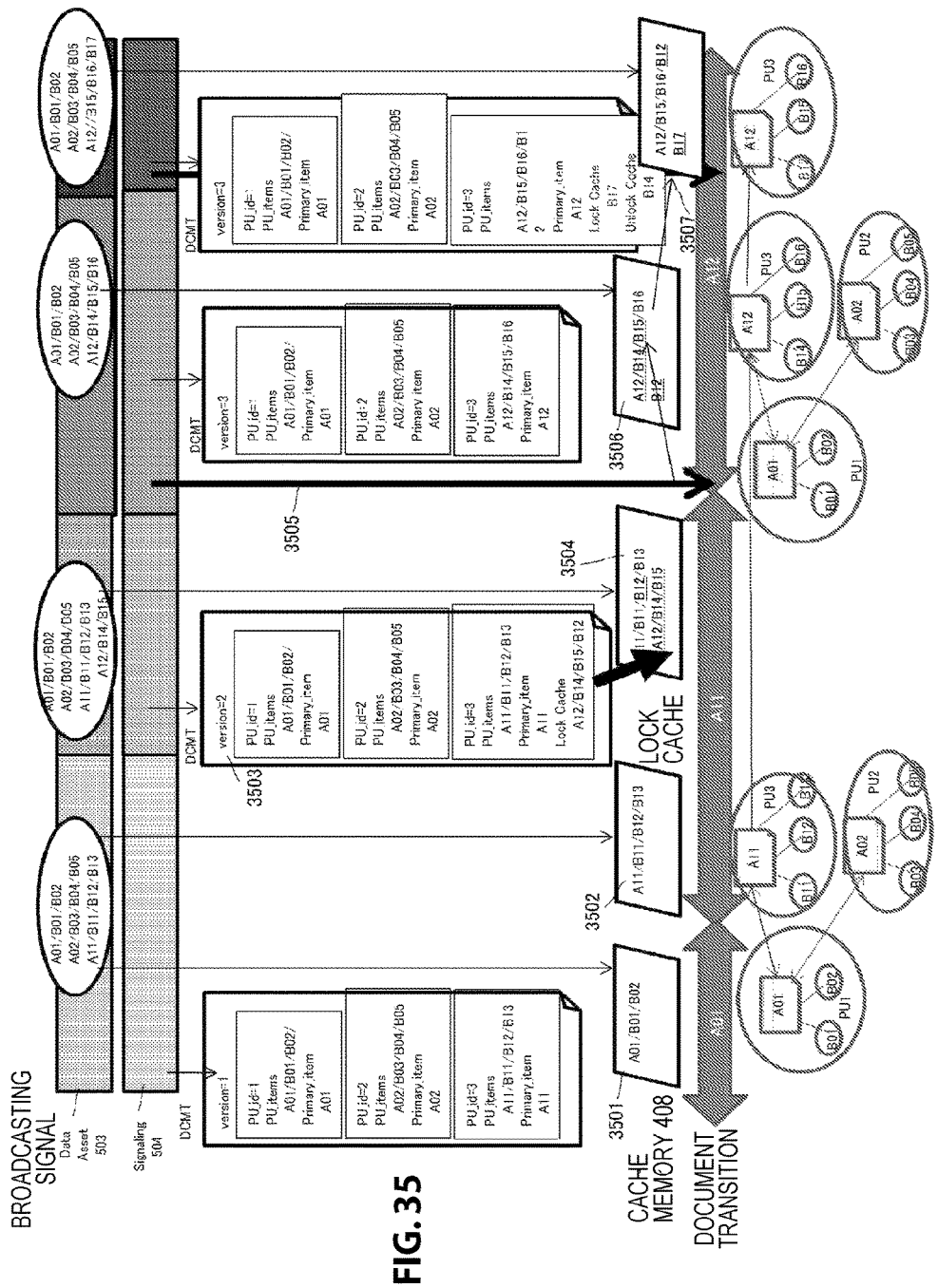
FIG. 35 is a diagram illustrating an example of a lock and unlock operation of caching of file data by the receiver 12 based on Method 2.

FIG. 35 illustrates an example of a cache lock and unlock operation of file data by the receiver 12 based on Method 2.

The application data control unit 407 interprets various signaling messages received on the MMT transmission path 504. A data transmission message that is one of the signaling messages includes a data content management table (DCMT).

While the data broadcasting application control engine 409 is performing an application operation of a data broadcasting presentation unit (PU) identified with PU_id=1, if the application data control unit 407 refers to the data content management table and thus acquires node_tag of each of an application file "A01.html" designated as primary_item (the center of data broadcasting presentation units) of the data broadcasting presentation unit (PU_id=1) that is currently in a presentation state and respective member files (PU_member_node) "B01" and "B02" from the data content management table and acquires entities of file data corresponding to the node_tag from the MMT transmission path 503 transporting data assets, the files are cached in the cache memory 408 as indicated by reference numeral 3301. Note that a method for accessing a file transported on the MMT transmission path 503 from node_tag is as described above with reference to FIG. 30 (the same applies hereinbelow). However, since no lock cache targets are designated for this data broadcasting presentation unit (PU), no cache operation is performed.

Next, it is assumed that a state transitions to a presentation state of another data broadcasting presentation unit (PU) identified with PU_id=3 through an application operation of the data broadcasting application engine 409. If the application data control unit 407 acquires node_tag of each of an application file "A11.html" designated as primary_item (the center of data broadcasting presentation units) of the data broadcasting presentation unit (PU_id=3) to which transition has been completed and respective member files (PU_member_node) "B11," "B12," and "B13" from the data content management table as described above, the application data control unit acquires entities of file data corresponding to the node_tag from the MMT transmission path 503 and caches them in the cache memory 408 as indicated by reference numeral 3502. However, since no lock cache target has been designated for this data broadcasting presentation unit (PU), no lock cache operation is performed.

The application data control unit 407 interprets various signaling messages received on the MMT transmission path 504 at all times. In addition, as indicated by reference numeral 3503, if the version of the data content management table is detected to have been updated from 1 to 2, the application data control unit 407 checks whether or not there is a change in primary_item of the data broadcasting presentation unit (PU_id=3) that is currently in a presentation state, each of the member files, and a lock cache target file. Since there is no change in the member files this time, respective member files that were previously cached remain stored in the cache memory 408. In addition, "A12," "B14," "B12," and "B15" are added as lock cache target files of the data broadcasting presentation unit (PU_id=3), the application data control unit 407 acquires entities of file data corresponding to their node_tag from the MMT transmission path 503, caches them in the cache memory 408 as indicated by reference numeral 3504, and thus separately manages them as lock cache target files. In the drawing, the files managed as lock cache targets are indicated with underlines (the same applies hereinbelow).

Next, as indicated by reference numeral 3505, if an event message instructing updating of presentation of data broadcasting is received from the MMT transmission path 504, the data broadcasting application engine 409 performs transition of an HTML document from an A11 file being executed to an A12 file. On the other hand, substantially at the same time, the application data control unit 407 refers to the data content management table of which the version has been updated from 2 to 3, and thereby detects that primary_item of the data broadcasting presentation unit (PU_id=3) that is currently in a presentation state has changed to "A12.html" and member files have changed to "B14," "B15," and "B16." Since primary_item "A12.html" and the member files "B14" and "B15" have already been lock-cached in the cache memory 408 as described above, the data broadcasting application engine 409 can quickly display data broadcasting using the files stored in the cache memory 408. In other words, timely data broadcasting interoperating with a broadcast program can be presented. In addition, since no lock cache target has been designated for this data broadcasting presentation unit (PU), no lock cache operation is performed. While the lock cached files "A12," "B14," "B12," and "B15" remain in storage in the cache memory 408 as indicated by reference numeral 3506, the unnecessary file "A11" is deleted.

Furthermore, when an event message instructing updating of presentation of data broadcasting is received from the MMT transmission path 504, the application data control unit 407 refers to the data content management table and thus adds "B17" as a lock cache target file and adds "B14" as an unlock target file for the data broadcasting presentation unit (PU_id=3) that is currently in a presentation state. Thus, as indicated by reference numeral 3507, the application data control unit 407 acquires an entity of file data corresponding to node_tag of the file "B17" from the MMT transmission path 503 and lock-caches it in the cache memory 408, and deletes the lock-cached file "B14" from the cache memory 408 to exclude it from lock targets.

In a data broadcasting service based on Broadcast Markup Language (BML) currently in operation, when an Application Programming Interface (API) that is "LockModuleOnMemory( )" is called out, a specific file can be pre-cached in a cache memory and saved (refer to, for example, Patent Literature 2) It is necessary in this method to incorporate a special specification based on a premise of a broadcasting operation into a specification of an application such as a script.

On the other hand, according to the technology disclosed in the present specification, a transmission side such as a broadcasting station includes information for designating a compulsory cache (pre-cache, or cache lock and unlock) in signaling related to data broadcasting and then transmits the information, and a receiver side performs cache control of data broadcasting files based on the compulsory cache information included in the received signaling related to the data broadcasting. Thus, according to the technology disclosed in the present specification, a highly versatile format can be maintained in data broadcasting based on new HTML5, without incorporating a special specification based on a premise of a broadcasting operation into a specification of an application such as a script.

INDUSTRIAL APPLICABILITY

The foregoing thus describes the technology disclosed in this specification in detail and with reference to specific embodiments. However, it is obvious that persons skilled in the art may make modifications and substitutions to these embodiments without departing from the spirit of the technology disclosed in this specification.

The technology disclosed in the present specification can be applied to various broadcasting systems that employ MT as a transport method. In addition, the technology disclosed in the present specification can be applied to a variety of data broadcasting systems in which file data to be used in data broadcasting interoperating with a broadcast program is transported in an MMT method or any other transport method.

Essentially, the technology disclosed in this specification has been described by way of example, and the stated content of this specification should not be interpreted as being limiting. The spirit of the technology disclosed in this specification should be determined in consideration of the claims.

Additionally, the present technology may also be configured as below.

(1)

A transmission apparatus including:

a file data transmission unit configured to transmit file data to be used in data broadcasting; and a signaling message transmission unit configured to include compulsory cache information for designating compulsory cache of file data in signaling related to data broadcasting and transmit the information.

(2)

The transmission apparatus according to (1), wherein the signaling message transmission unit transmits a data transmission message including a data content management table in which information of a list of broadcasting transport files and a central file constituting a presentation unit, and a list of pre-cache target files is described for each data broadcasting presentation unit.

(3)

The transmission apparatus according to (1), wherein the signaling message transmission unit transmits a data transmission message including a data content management table in which information of a list of broadcasting transport files and a central file constituting a presentation unit, and a target file to be locked in a cache and a target file to be unlocked among lock targets is described for each data broadcasting presentation unit.

(4)

The transmission apparatus according to any of (1) to (3), further including:

a media data transmission unit configured to transmit media data of the main body of a broadcast program with which data broadcasting interoperates.

(5)

A transmission method including:

a file data transmission step of transmitting file data to be used in data broadcasting; and a signaling message transmission step of including compulsory cache information for designating compulsory cache of file data in signaling related to data broadcasting and transmitting the information.

(6)

A reception apparatus including:

a file data reception unit configured to transmit file data to be used in data broadcasting;

a signaling message reception unit configured to include compulsory cache information for designating compulsory cache of file data in signaling related to data broadcasting and transmit the information; and a control unit configured to control cache of the file data received by the file data reception unit in a cache memory based on the compulsory cache information.

(7)

The reception apparatus according to (6), wherein the signaling message reception unit receives a data transmission message including a data content management table in which information of a list of broadcasting transport files and a central file constituting a presentation unit, and a list of pre-cache target files is described for each data broadcasting presentation unit.

(8)

The reception apparatus according to (7), wherein, when the file data receives a file included in the list of pre-cache target files, the control unit pre-caches the file in the cache memory.

(9)

The reception apparatus according to (6), wherein the signaling message reception unit receives a data transmission message including a data content management table in which information of a list of broadcasting transport files and a central file constituting a presentation unit, and a target file to be locked in a cache and a target file to be unlocked among lock targets is described for each data broadcasting presentation unit.

(10)

The reception apparatus according to (9), wherein, when the file data receives the lock target file, the control unit pre-caches the file in the cache memory.

(11)

The reception apparatus according to (9), wherein the control unit deletes the unlock target file from the cache memory.

(12)

The reception apparatus according to any of (6) and (9), wherein, when the file data receives a list of broadcasting transport files and a central file constituting a current data broadcasting presentation unit, the control unit caches the data in the cache memory.

(13)

The reception apparatus according to any of (6) to (12), further including: a data broadcasting presentation unit configured to present data broadcasting using file data.

(14)

The reception apparatus according to any of (6) to (13), further including: a media data reception unit configured to receive media data of the main body of a broadcast program with which data broadcasting interoperates, and a broadcast program presentation unit configured to present a broadcast program based on media data.

(15)

A reception method including:

a file data reception step of transmitting file data to be used in data broadcasting;

a signaling message reception step of including compulsory cache information for designating compulsory cache of file data in signaling related to data broadcasting and transmitting the information; and a control step of controlling cache of the file data received by the file data reception unit in a cache memory based on the compulsory cache information.

REFERENCE SIGNS LIST 10 digital broadcasting system
11 broadcasting sending system
12 receiver
301 clock unit
302 signal sending unit
303 video encoder
304 audio encoder
305 caption encoder
306 signaling encoder
307 file encoder
308 information system
309 TLV signaling encoder
310 IP service multiplexer
311 TLV multiplexer
312 modulation/transmission unit
401 tuner/demodulator
402 demultiplexer
403 clock unit
404 video decoder
405 audio decoder
406 caption decoder
407 application data control unit
408 cache memory
409 data broadcasting application engine
410 system control unit
411 synthesizing unit
412 IP interface

The invention claimed is:

1. A transmission apparatus comprising:

a data file transmission unit configured to transmit a data file to be used in data broadcasting in a first transport packet in which first payload type information indicating that the data file is included in a payload is inserted into a packet header; and a signaling message transmission unit configured to transmit a signaling message related to the data broadcasting in a second transport packet in which second payload identification information indicating that the signaling message is included in a payload is inserted into a packet header, wherein the signaling message transmission unit includes, in the signaling message, a data content management table in which a presentation unit tag for identifying a presentation unit of data broadcasting, the number of nodes to be unlocked from cache of each presentation unit, and unlock cache information indicating a node tag for identifying an unlock target node are described, and a data asset management table in which item identification information for identifying a data file related to the node tag is described, and transmits the message.

2. The transmission apparatus according to claim 1, wherein the signaling message transmission unit further includes, in the signaling message, a link presentation unit tag for identifying another presentation unit linked to the presentation unit of the data broadcasting and transmits the message.

3. A transmission method comprising:

a data file transmission step of a data file transmission unit included in a transmission apparatus transmitting a data file to be used in data broadcasting in a first transport packet in which first payload type information indicating that the data file is included in a payload is inserted into a packet header; and a signaling message transmission step of a signaling message transmission unit included in the transmission apparatus transmitting a signaling message related to the data broadcasting in a second transport packet in which second payload type information indicating that the signaling message is included in a payload is inserted into a packet header, wherein, in the signaling message transmission step, a data content management table in which a presentation unit tag for identifying a presentation unit of data broadcasting, the number of nodes to be unlocked from cache of each presentation unit, and unlock cache information indicating a node tag for identifying an unlock target node are described, and a data asset management table in which item identification information for identifying a data file related to the node tag is described are included in the signaling message and transmitted.

4. A reception apparatus comprising:

a data file reception unit configured to receive a first transport packet that includes a data file to be used in data broadcasting in a payload, in which first payload type information indicating that the data file is included in the payload is inserted into a packet header;

a signaling message reception unit configured to receive a second transport packet that includes a signaling message to be used in the data broadcasting in a payload, in which second payload identification information indicating that the signaling message is included in the payload is inserted into a packet header; and a control unit configured to control cache of a data file based on a data content management table in which a presentation unit tag for identifying a presentation unit of data broadcasting, the number of nodes to be unlocked from cache of each presentation unit, and unlock cache information indicating a node tag for identifying an unlock target node are described, and a data asset management table in which item identification information for identifying a data file related to the node tag is described, both tables included in the signaling message.

5. A reception method comprising:

a data file reception step of a data file reception unit included in a reception apparatus receiving a first transport packet that includes a data file to be used in data broadcasting in a payload, in which first payload type information indicating that the data file is included in the payload is inserted into a packet header;

a signaling message reception step of a signaling message reception unit included in the reception apparatus receiving a second transport packet that includes a signaling message related to the data broadcasting in a payload, in which second payload identification information indicating that the signaling message is included in the payload is inserted into a packet header; and a control step of a control unit included in the reception apparatus controlling cache of a data file based on a data content management table in which a presentation unit tag for identifying a presentation unit of data broadcasting, the number of nodes to be unlocked from cache of each presentation unit, and unlock cache information indicating a node tag for identifying an unlock target node are described, and a data asset management table in which item identification information for identifying a data file related to the node tag is described, both tables included in the signaling message.

* * * * *